(12) United States Patent
Mochida

(10) Patent No.: US 9,176,891 B2
(45) Date of Patent: Nov. 3, 2015

(54) PROCESSOR, PROCESSING SYSTEM, DATA SHARING PROCESSING METHOD, AND INTEGRATED CIRCUIT FOR DATA SHARING PROCESSING

(75) Inventor: Tetsuji Mochida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1036 days.

(21) Appl. No.: 12/594,246

(22) PCT Filed: Mar. 18, 2009

(86) PCT No.: PCT/JP2009/001205
§ 371 (c)(1),
(2), (4) Date: Oct. 27, 2009

(87) PCT Pub. No.: WO2009/116279
PCT Pub. Date: Sep. 24, 2009

(65) Prior Publication Data
US 2010/0077156 A1 Mar. 25, 2010

(30) Foreign Application Priority Data
Mar. 19, 2008 (JP) .................................. 2008-070998

(51) Int. Cl.
*G06F 12/10* (2006.01)
*G06F 13/16* (2006.01)
*G06F 13/368* (2006.01)
*G06F 15/167* (2006.01)

(52) U.S. Cl.
CPC .......... *G06F 12/1072* (2013.01); *G06F 13/368* (2013.01); *G06F 13/16* (2013.01); *G06F 15/167* (2013.01)

(58) Field of Classification Search
CPC ... G06F 12/1072; G06F 15/167; G06F 13/16; G06F 13/368; G06F 13/374
See application file for complete search history.

(56) References Cited

U.S. PATENT DOCUMENTS

| 5,592,625 A * | 1/1997 | Sandberg ...................... 711/147 |
| 7,080,215 B2 * | 7/2006 | Ueno ............................ 711/147 |
| 2005/0273571 A1 * | 12/2005 | Lyon et al. .................... 711/203 |

FOREIGN PATENT DOCUMENTS

| JP | 61-122771 | 6/1986 |
| JP | 62-1059 | 1/1987 |
| JP | 2-81255 | 3/1990 |

(Continued)

OTHER PUBLICATIONS

International Search Report issued Jun. 2, 2009 in International (PCT) Application No. PCT/JP2009/001205.

*Primary Examiner* — Gary W Cygiel
(74) *Attorney, Agent, or Firm* — Wenderoth, Lind & Ponack, L.L.P.

(57) ABSTRACT

A processing device processes data with use of one or more data blocks shared with a plurality of external processing devices. The device includes a processor, and a shared data storage unit that stores, respectively in one or more storage areas thereof, one or more data blocks to be shared with one or more external processing devices. An output unit outputs, when the processor makes an access request to write data in a part of one of the data blocks, a block identifier identifying the one of the data blocks, and the data pertaining to the access request. An input unit judges whether to share external data outputted from one of the external processing devices, based on a block identifier outputted from the one of the external processing devices, and only when judging affirmatively, causes the shared data storage unit to store the external data.

17 Claims, 30 Drawing Sheets

(56) References Cited

FOREIGN PATENT DOCUMENTS

| JP | 3-127248 | 5/1991 |
|---|---|---|
| JP | 4-333962 | 11/1992 |
| JP | 2003-316753 | 11/2003 |
| JP | 2005-267392 | 9/2005 |
| JP | 2007-249547 | 9/2007 |
| JP | 2008-15617 | 1/2008 |
| JP | 2008-225906 | 9/2008 |

* cited by examiner

FIG.4A Output Management Information Table

| | 181 | 182 | 183 | 184 | 185 | 180 |
|---|---|---|---|---|---|---|
| | Valid | Master ID | Data ID | Start Address | End Address | |
| | 1 | 0 | 0 | 0x0000 | 0x00ff | |
| | 1 | 0 | 1 | 0x0100 | 0x01ff | |
| | 1 | 0 | 2 | 0x0200 | 0x02ff | |
| | 1 | 0 | 3 | 0x0300 | 0x03ff | |
| | 0 | 0 | 4 | — | — | |
| | 0 | 0 | 5 | — | — | |

FIG.4B Input Management Information Table

| | 191 | 192 | 193 | 194 | 195 | 190 |
|---|---|---|---|---|---|---|
| | Valid | Master ID | Data ID | Start Address | End Address | |
| | 1 | 1 | 0 | 0x0000 | 0x007f | |
| | 1 | 1 | 1 | 0x0100 | 0x01ff | |
| | 1 | 2 | 0 | 0x0200 | 0x02ff | |
| | 1 | 3 | 0 | 0x0300 | 0x03ff | |
| | 0 | — | — | — | — | |
| | 0 | — | — | — | — | |

FIG.10

Output Management Information Table Of Computer

| Setting Target | Valid | Master ID | Data ID | Start Address | End Address |
|---|---|---|---|---|---|
| Computer 100A | 1 | 0 | 0 | a | b−1 |
|  | 1 | 0 | 1 | b | c−1 |
|  | 1 | 0 | 2 | c | d−1 |
|  | 0 | 0 | 3 | — | — |
| Computer 100B | 1 | 1 | 0 | f | g−1 |
|  | 0 | 1 | 1 | — | — |
|  | 0 | 1 | 2 | — | — |
|  | 0 | 1 | 3 | — | — |
| Computer 100C | 1 | 2 | 0 | j | k−1 |
|  | 0 | 2 | 1 | — | — |
|  | 0 | 2 | 2 | — | — |
|  | 0 | 2 | 3 | — | — |
| Computer 100D | 1 | 3 | 0 | n | o−1 |
|  | 0 | 3 | 1 | — | — |
|  | 0 | 3 | 2 | — | — |
|  | 0 | 3 | 3 | — | — |
| Computer 100E | 0 | 4 | 0 | — | — |
|  | 0 | 4 | 1 | — | — |
|  | 0 | 4 | 2 | — | — |
|  | 0 | 4 | 3 | — | — |

Output Management Information Table Of Computer

| Setting Target | Valid | Master ID | Data ID | Start Address | End Address |
|---|---|---|---|---|---|
| Computer 100A | 0 | — | — | — | — |
| | 0 | — | — | — | — |
| | 0 | — | — | — | — |
| | 0 | — | — | — | — |
| Computer 100B | 1 | 0 | 0 | 0 | f−1 |
| | 1 | 2 | 0 | g | h−1 |
| | 0 | — | — | — | — |
| | 0 | — | — | — | — |
| Computer 100C | 1 | 0 | 1 | 0 | i−1 |
| | 1 | 1 | 0 | i | j−1 |
| | 1 | 3 | 0 | k | l−1 |
| | 0 | — | — | — | — |
| Computer 100D | 1 | 0 | 2 | 0 | m−1 |
| | 1 | 2 | 0 | m | n−1 |
| | 0 | — | — | — | — |
| | 0 | — | — | — | — |
| Computer 100E | 1 | 1 | 0 | 0 | p−1 |
| | 1 | 2 | 0 | p | q−1 |
| | 1 | 3 | 0 | q | r−1 |
| | 0 | — | — | — | — |

196

FIG.13A Digital Broadcasting Receiver 1000A
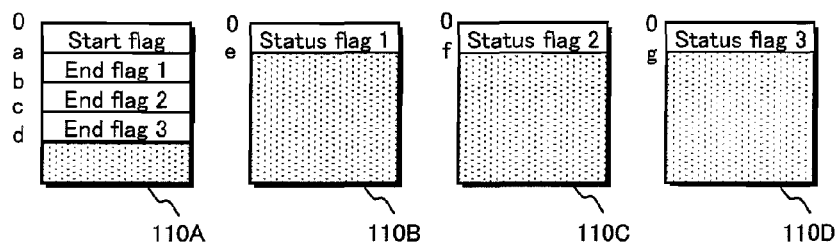
FIG.13B Digital Broadcasting Receiver 10A (Conventional) (PRIOR ART)
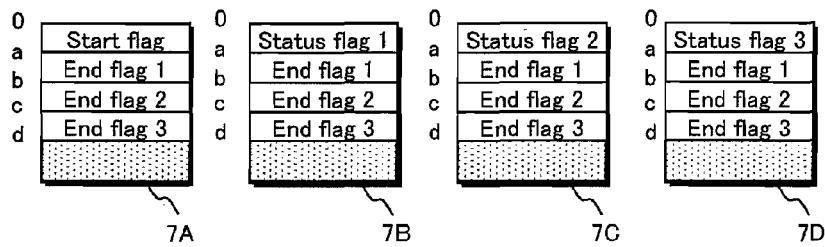

FIG.14A  Output Management Information Table Of Computer

| Setting Target | Valid | Master ID | Data ID | Start Address | End Address |
|---|---|---|---|---|---|
| Computer 100A | 1 | 0 | 0 | 0 | a−1 |
| | 0 | 0 | 1 | — | — |
| | 0 | 0 | 2 | — | — |
| Computer 100B | 1 | 1 | 0 | 0 | e−1 |
| | 0 | 1 | 1 | — | — |
| | 0 | 1 | 2 | — | — |
| Computer 100C | 1 | 2 | 0 | 0 | f−1 |
| | 0 | 2 | 1 | — | — |
| | 0 | 2 | 2 | — | — |
| Computer 100D | 1 | 3 | 0 | 0 | g−1 |
| | 0 | 3 | 1 | — | — |
| | 0 | 3 | 2 | — | — |

FIG.14B  Input Management Information Table Of Computer

| Setting Target | Valid | Master ID | Data ID | Start Address | End Address |
|---|---|---|---|---|---|
| Computer 100A | 1 | 1 | 0 | a | b−1 |
| | 1 | 2 | 0 | b | c−1 |
| | 1 | 3 | 0 | c | d−1 |
| Computer 100B | 1 | 0 | 0 | 0 | e−1 |
| | 0 | — | — | — | — |
| | 0 | — | — | — | — |
| Computer 100C | 1 | 0 | 0 | 0 | f−1 |
| | 0 | — | — | — | — |
| | 0 | — | — | — | — |
| Computer 100D | 1 | 0 | 0 | 0 | g−1 |
| | 0 | — | — | — | — |
| | 0 | — | — | — | — |

FIG.18A  Output Management Information Table Of Computer

| Setting Target | Valid | Master ID | Data ID | Start Address | End Address |
|---|---|---|---|---|---|
| Computer 100A | 1 | 0 | 0 | 0 | a−1 |
| | 1 | 0 | 1 | a | b−1 |
| | 0 | 0 | 2 | — | — |
| Computer 100B | 1 | 1 | 0 | 0 | c−1 |
| | 1 | 1 | 1 | c | d−1 |
| | 0 | 1 | 2 | — | — |
| Computer 100C | 1 | 2 | 0 | 0 | e−1 |
| | 1 | 2 | 1 | e | f−1 |
| | 0 | 2 | 2 | — | — |
| Computer 100D | 1 | 3 | 0 | 0 | g−1 |
| | 0 | 3 | 1 | — | — |
| | 0 | 3 | 2 | — | — |

FIG.18B  Input Management Information Table Of Computer

| Setting Target | Valid | Master ID | Data ID | Start Address | End Address |
|---|---|---|---|---|---|
| Computer 100A | 1 | 1 | 0 | 0 | a−1 |
| | 1 | 3 | 0 | 0 | a−1 |
| | 0 | — | — | — | — |
| Computer 100B | 1 | 0 | 0 | 0 | c−1 |
| | 1 | 0 | 1 | c | d−1 |
| | 1 | 2 | 0 | 0 | c−1 |
| Computer 100C | 1 | 1 | 0 | 0 | e−1 |
| | 1 | 1 | 1 | e | f−1 |
| | 1 | 3 | 0 | 0 | e−1 |
| Computer 100D | 1 | 2 | 0 | 0 | g−1 |
| | 1 | 2 | 1 | g | h−1 |
| | 0 | — | — | — | — |

FIG.21A Output Management Information Table Of Computer (Stationary Time)

| Setting Target | Valid | Master ID | Data ID | Start Address | End Address |
|---|---|---|---|---|---|
| Computer 100B | 1 | 1 | 0 | a | b−1 |
|  | 0 | 1 | 1 | — | — |
| Computer 100C | 1 | 2 | 0 | c | d−1 |
|  | 0 | 2 | 1 | — | — |
| Computer 100D | 0 | — | — | — | — |
|  | 0 | — | — | — | — |

FIG.21B Input Management Information Table Of Computer (Stationary Time)

| Setting Target | Valid | Master ID | Data ID | Start Address | End Address |
|---|---|---|---|---|---|
| Computer 100B | 1 | 0 | 0 | 0 | a−1 |
|  | 0 | — | — | — | — |
| Computer 100C | 1 | 1 | 0 | 0 | c−1 |
|  | 0 | — | — | — | — |
| Computer 100D | 1 | 2 | 0 | 0 | e−1 |
|  | 0 | — | — | — | — |

FIG.21C Input Management Information Table Of Computer 100E (Distributed Processing Time)

| Setting Target | Valid | Master ID | Data ID | Start Address | End Address |
|---|---|---|---|---|---|
| Computer 100E | 1 | 1 | 0 | 0 | g−1 |
|  | 0 | — | — | — | — |

FIG.21D Input Management Information Table Of Computer 100D (Distributed Processing Time)

| Setting Target | Valid | Master ID | Data ID | Start Address | End Address |
|---|---|---|---|---|---|
| Computer 100D | 1 | 2 | 0 | 0 | e−1 |
|  | 1 | 4 | 0 | 0 | e−1 |

197

FIG.21E Output Management Information Table Of Computer 100E (Distributed Processing Time)

| Setting Target | Valid | Master ID | Data ID | Start Address | End Address |
|---|---|---|---|---|---|
| Computer 100E | 1 | 4 | 0 | g | h−1 |
|  | 0 | — | — | — | — |

FIG.22A Output Management Information Table Of Computer (Stationary Time)

| Setting Target | Valid | Master ID | Data ID | Start Address | End Address |
|---|---|---|---|---|---|
| Computer 100B | 1 | 1 | 0 | a | b−1 |
| | 0 | 1 | 1 | — | — |
| Computer 100C | 1 | 2 | 0 | c | d−1 |
| | 0 | 2 | 1 | — | — |
| Computer 100D | 0 | — | — | — | — |
| | 0 | — | — | — | — |
| Computer 100E | 1 | 4 | 0 | g | h−1 |
| | 1 | 4 | 1 | h | i−1 |
| | 1 | 4 | 2 | i | j−1 |

FIG.22B Input Management Information Table Of Computer (Stationary Time)

| Setting Target | Valid | Master ID | Data ID | Start Address | End Address |
|---|---|---|---|---|---|
| Computer 100B | 1 | 0 | 0 | 0 | a−1 |
| | 0 | — | — | — | — |
| Computer 100C | 1 | 1 | 0 | 0 | c−1 |
| | 1 | 4 | 0 | 0 | c−1 |
| Computer 100D | 1 | 2 | 0 | 0 | e−1 |
| | 1 | 4 | 1 | 0 | e−1 |
| | 1 | 4 | 2 | e | f−1 |
| Computer 100E | 1 | 0 | 0 | 0 | g−1 |
| | 1 | 1 | 0 | g | h−1 |
| | 1 | 2 | 0 | h | i−1 |
| | 0 | — | — | — | — |

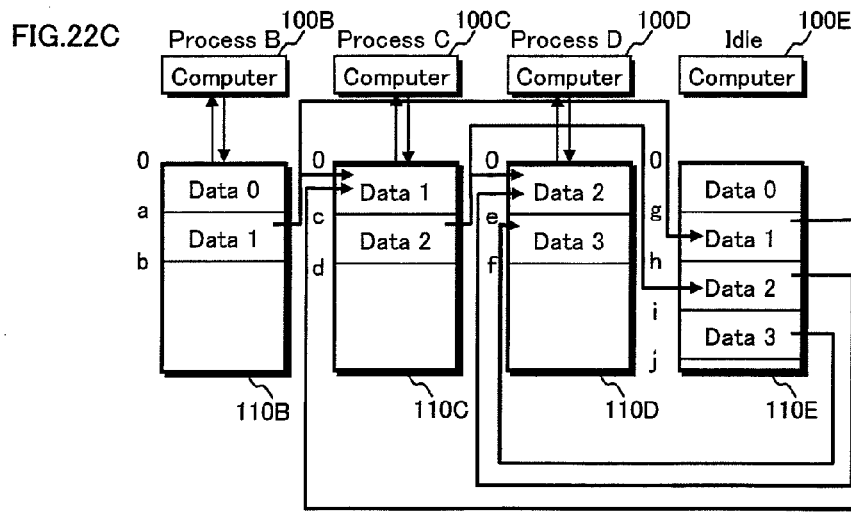

FIG.22C

FIG.23B  Output Management Information Table Of Computer

| Setting Target | Valid | Master ID | Data ID | Start Address | End Address |
|---|---|---|---|---|---|
| Computer 100A | 1 | 0 | 0 | a | b−1 |
| | 1 | 0 | 1 | b | c−1 |
| | 1 | 0 | 2 | c | d−1 |
| | 1 | 0 | 3 | d | e−1 |
| | 1 | 0 | 4 | e | f−1 |
| | 1 | 0 | 5 | f | g−1 |
| | 1 | 0 | 6 | g | h−1 |

FIG.23C  Input Management Information Table Of Computer

| Setting Target | Valid | Master ID | Data ID | Start Address | End Address |
|---|---|---|---|---|---|
| Computer 100B | 1 | 0 | 0 | 0 | i−1 |
| | 1 | 0 | 1 | i | j−1 |
| | 1 | 0 | 4 | j | k−1 |
| | 1 | 0 | 6 | k | l−1 |
| Computer 100C | 1 | 0 | 0 | 0 | m−1 |
| | 1 | 0 | 2 | m | n−1 |
| | 1 | 0 | 4 | n | o−1 |
| | 1 | 0 | 5 | o | p−1 |
| Computer 100D | 1 | 0 | 0 | 0 | q−1 |
| | 1 | 0 | 3 | q | r−1 |
| | 1 | 0 | 5 | r | s−1 |
| | 1 | 0 | 6 | s | t−1 |

FIG.28A  Output Shared Data Management Information Table Of Computer

| Setting Target | Valid | Master ID | Data ID | Processor ID | Start Address | End Address |
|---|---|---|---|---|---|---|
| Computer 500A | 1 | 0 | 0 | 0 | 0 | a−1 |
|  | 1 | 0 | 1 | 1 | 0 | a−1 |
|  | 0 | 0 | 2 | — | — | — |
| Computer 500B | 1 | 1 | 0 | 0 | 0 | b−1 |
|  | 0 | 1 | 1 | — | — | — |
|  | 0 | 1 | 2 | — | — | — |
| Computer 500C | 1 | 2 | 0 | 0 | 0 | c−1 |
|  | 0 | 2 | 1 | — | — | — |
|  | 0 | 2 | 2 | — | — | — |
| Computer 500D | 0 | 3 | 0 | — | — | — |
|  | 0 | 3 | 1 | — | — | — |
|  | 0 | 3 | 2 | — | — | — |

FIG.28B  Input Management Information Table Of Computer

| Setting Target | Valid | Master ID | Data ID | Start Address | End Address |
|---|---|---|---|---|---|
| Computer 500A | 0 | — | — | — | — |
|  | 0 | — | — | — | — |
|  | 0 | — | — | — | — |
| Computer 500B | 1 | 0 | 0 | 0 | b−1 |
|  | 0 | — | — | — | — |
|  | 0 | — | — | — | — |
| Computer 500C | 1 | 1 | 0 | 0 | c−1 |
|  | 1 | 0 | 1 | 0 | c−1 |
|  | 0 | — | — | — | — |
| Computer 500D | 1 | 2 | 0 | 0 | d−1 |
|  | 0 | — | — | — | — |
|  | 0 | — | — | — | — |

PROCESSOR, PROCESSING SYSTEM, DATA SHARING PROCESSING METHOD, AND INTEGRATED CIRCUIT FOR DATA SHARING PROCESSING

BACKGROUND OF THE INVENTION

1. Technical Field

The present invention relates to a multiprocessor system, and particularly to a technique for sharing data among processors.

2. Background Art

As a method for sharing data among a plurality of processors in a multiprocessor system, the following method (so-called tightly-coupled multiprocessor system) is known. Data to be shared is stored in a single shared memory, and processors access this shared memory so as to share the data with one another.

This method has an advantage that the identity of shared data used by processors can be easily maintained. On the other hand, this method is problematic in that, as processors increase in number, they are more likely to contend with one another for accessing the shared memory, which results in lowering of the processing efficiency of the entire system.

This is particularly problematic in processes that require real-time performance, such as a process to receive digital broadcasting data, e.g. image data, transmitted from a broadcast station, and to decode the data for display.

As a means for solving this problem, the following method (so-called loosely-coupled multiprocessor system) is known. Each processor has a dedicated memory for storing therein a copy of shared data, and each accesses its own dedicated memory. (e.g. Patent Documents 1 and 2).

FIG. 30 shows a conventional data-sharing method used in the loosely-coupled multiprocessor system.

As shown in FIG. 30, a dedicated memory 3A is used by a processor 1A, a dedicated memory 3B by a processor 1B, and a dedicated memory 3C by a processor 1C. Each dedicated memory has a predetermined shared area for storing therein a copy of shared data.

When an access request is transmitted from each processor to access its dedicated memory, a memory control device 4 controls bus selection circuits 5A-5C according to whether the access request is to write data in the shared area in the dedicated memory.

For example, when an access request from the processor 1A is a write request to write data in its shared area, the memory control device 4 controls the bus selection circuits 5A-5C to write the data in the shared areas of the dedicated memories 3A-3C. When the access request from the processor 1A is a request to write data in other area than its shared area or to read out data from either of the areas, the memory control device 4 controls the bus selection circuits 5A-5C to access solely the dedicated memory 3A.

As a result, when the shared data in the dedicated memory of one of the processors is updated, the shared data in the dedicated memory of each of the remaining processors is also updated. Therefore, the identity of the shared data can be maintained. In addition, it is only when a write request is made to write data in the shared area in the dedicated memory of one of the processors, the shared data in the dedicated memory of each of the remaining processors is updated. This reduces the possibility of occurrence of access contention.

Patent Document 1: Japanese Unexamined Patent Application Publication No. 61-122771

Patent Document 2: Japanese Unexamined Patent Application Publication No. 3-127248

SUMMARY OF THE INVENTION

However, according to the conventional method, all shared data pieces necessary for being processed in the entire multiprocessor system are stored in the dedicated memories of all the processors.

For example, with regard to the above processors 1A-1C, even when the processors 1A and 1B need to share data, and the processor 1C does not, the data is also stored in the dedicated memory 3C of the processor 1C.

As a result, the storage area in the dedicated memory 3C is wastefully consumed for storing therein data unnecessary for the processor 1C. In addition, when these processors update the data shared between the processors 1A and 1B, the updated data is also written into the dedicated memory 3C, which increases the possibility of unwanted contention with the processor 1C that accesses the dedicated memory 3C.

The present invention is conceived in view of the above problem. The object of the present invention is to provide a processing device, a processing system, a data-sharing processing method, and a data-sharing processing integrated circuit each of which can prevent wasteful consumption of a storage area in a dedicated memory thereof and wasteful access contention.

To solve the above problem, the present invention provides a processing device that processes data with use of one or more data blocks shared with a plurality of external processing devices, including: a processor; a shared data storage unit that stores, respectively in one or more storage areas thereof, one or more data blocks to be shared with one or more external processing devices; an output unit operable to output, when the processor makes an access request to write data in a part of one of the data blocks, (a) a block identifier identifying the one of the data blocks, and (b) the data pertaining to the access request; and an input unit operable to judge whether to share external data outputted from one of the external processing devices, based on a block identifier outputted from the one of the external processing devices, and (i) when judging affirmatively, to cause the shared data storage unit to store the external data, and (ii) when judging negatively, not to cause the shared data storage unit to store the external data.

Here, the data-sharing is defined as follows. The processing device and the one or more external processing devices stores copies of the one or more data blocks to be, respectively, shared in the shared data storage unit and the storage unit, such as a memory. The processing device and the external processing devices can share the data with one another by accessing their respective storage units.

The input unit with the above configuration provided in the processing device pertaining to the present invention causes the shared data storage unit to store only the external data that is outputted from the external processing devices and that is to be shared with the processing device, which can prevent wasteful consumption of a storage area in the shared data storage unit caused by storing unnecessary data. The input unit does not cause the shared data storage unit to stores data unnecessary for the processing device, which prevents access contention between (i) an access request to write, in the shared storage unit, the external data that is outputted from the external processing device and that is unnecessary for the processing device and (ii) another access request made by the processor to access the shared data storage unit.

In addition, with the stated structure, the output unit outputs data to be shared with the external processing device, and as described above, the input unit causes the shared data storage unit to store only the external data to be shared with the processing device. Accordingly, the processor needs no processing for sharing data, being able to concentrate on predetermined processing.

In addition, the processing device may further includes: a management information storage unit that stores therein, in one-to-one correspondence, block identifiers of the data blocks stored in the storage areas and addresses of the storage areas, wherein when the processor makes the access request to write the data in one of the storage areas shown by one of the addresses, the output unit outputs the block identifier and the data pertaining to the access request, and when one of the block identifiers stored in the management information storage unit is identical with the block identifier outputted from the one of the external processing devices, the input unit judges affirmatively and may cause the external data to be written in one of the storage areas shown by one of the addresses that corresponds to the identical block identifier.

Thus, with the stated structure, the processing device pertaining to the present invention stores, for each data block, a block identifier and an address showing a storage area of the data block. Accordingly, data can be shared with the external processing device, in a data block unit.

In addition, the management information storage unit may further store therein, for each of data blocks to be updated by one of the external processing devices included in the data blocks stored in the shared data storage unit, an external device identifier identifying the external processing device, when the output unit outputs the block identifier and the data pertaining to the access request, the output unit may output a device identifier identifying the processing device, and the input unit may judge affirmatively only when the management information storage unit stores therein a device identifier and a block identifier respectively identical with the external device identifier and the block identifier outputted from the one of the external processing devices.

Thus, with the stated structure, the processing device pertaining to the present invention judges whether to share a data block outputted from the external processing device based on a combination of an external device identifier of the external processing device that outputs the data block and the block identifier. Accordingly, even when different external processing devices output the identical block identifier, only data to be shared with the processing device can be appropriately stored.

The processing device may further includes: a shared data access unit operable to access the shared data storage unit, based on an access request, wherein each time the processor makes the access request to the shared data storage unit, the output unit may transmit the access request to the shared data access unit, when the input unit judges affirmatively, the input unit may transmit, to the shared data access unit, an access request to write the external data in one of the storage areas shown by one of the addresses that corresponds to the block identifier pertaining to the judgment, and in a case of receiving the access request from the input unit and the access request from the output unit, the shared data access unit may access the shared data storage unit, based on the access request from the input unit in preference to the access request from the output unit.

Thus, with the stated structure, when an access request from a processor provided in the processor device contends with an access request to write external data outputted from the external processing device to be shared with the processing device, the latter access request is preferentially processed. Accordingly, data updated by the external processing device can be promptly reflected in the shared data storage unit. As a result, the processor provided in the processing device pertaining to the present invention can process data based on the data newly updated by the external processing device.

In response to execution of a predetermined program by the processor, information stored in the management information storage unit may be updated.

Thus, with the stated structure, based on information that is stored in the management information storage unit and that is updated by a processor provided in the processing device, the processing device pertaining to the present invention can share data with the external processing device. Accordingly, without a special external updating device or etc. for updating this information, the processing device can share the data with the external processing device.

The processing device may further includes: a buffer memory; and an access control unit operable to access the shared data storage unit or the buffer memory, based on an access request, wherein each time the processor makes the access request to the shared data storage unit, the output unit may transmit the access request to the access control unit, when the input unit judges affirmatively, the input unit may transmit, to the access control unit, an access request to write the external data in one of the storage areas shown by one of the addresses that corresponds to the block identifier pertaining to the judgment, and in a case of receiving the access request from the input unit, the access control unit (i) when receiving the access request from the output unit, may write the data pertaining to the access request from the input unit in the buffer memory, based on the access request from the input unit, and (ii) when not receiving the access request from the output unit or the input unit, may reflect, in the shared data storage unit, the data having written in the buffer memory.

Thus, with the stated structure, when an access request from the processor provided in the processing device contends with an access request to write external data outputted from the external processing device to be shared with the processing device, the data pertaining to the latter access request is stored in the buffer memory. Accordingly, the processor can promptly access the shared data storage unit.

When receiving the access request from the output unit or the input unit, the access control unit accesses, based on the access request from the output unit or the input unit, the shared data storage unit or the buffer memory, according to whether the one of the storage areas storing the data pertaining to the access request in the shared data storage unit is identical with a storage area storing, in the shared data storage unit, the data having written in the buffer memory.

Thus, with the stated structure, when the data pertaining to the access request from the processor is written in the buffer memory, for example, the processing device pertaining to the present invention can cause the buffer memory to be accessed. In this period, data to be shared with the processing device can be stored in the shared data storage unit. Accordingly, data updated by the external processing device can be promptly reflected in the shared data storage unit, and the access request from the processor can be promptly processed as well.

After having accessed the buffer memory based on the received access request, the access control unit may reflect accessed data in the shared data storage unit.

The above-mentioned accessed data is defined as (i) the data read out from the buffer when the access request is to read out data, and (ii) the write-target data when the access request is to write the data.

Thus, when the data pertaining to the access request is stored in the buffer memory, the processing device pertaining to the present invention can cause the buffer memory to be accessed. Accordingly, the data in the buffer memory can be promptly reflected in the shared data storage unit by reflecting the accessed data in the shared data storage unit after this, which is to say, while the processor does not access the shared data storage unit.

The processing device may further includes: an inherent data storage unit that stores therein one or more data blocks unnecessary to be shared with the external processing devices; and a data access unit operable to access the shared data storage unit or the inherent data storage unit, based on an access request, wherein each time the processor makes the access request, the output unit may transmit the access request to the data access unit, when the input unit judges affirmatively, the input unit may transmit, to the data access unit, an access request to write the external data in one of storage areas shown by one of the addresses that corresponds to the block identifier pertaining to the judgment, the data access unit is accessible to the shared data storage unit in parallel with the inherent data storage unit, and in a case of receiving the access request from the input unit and the access request from the output unit, when the one of the storage areas pertaining to the access request from the output unit is a storage area in the inherent data storage unit, the data access unit may access the inherent data storage unit, based on the access request from the output unit, in parallel with the shared data storage unit, based on the access request from the input unit.

Thus, with the stated structure, the access request with regard to data necessary only for the processing device cannot possibly contend with the access request to write external data outputted from the external processing device to be shared with the processing device. Accordingly, the access contention can be further reduced.

The shared data storage unit may includes: a first memory storing therein one or more data blocks to be updated only by the processing device included in the data blocks shared with the one or more external processing devices; and a second memory storing therein the one or more data blocks to be shared with the one or more external processing devices, and not storing the one or more data blocks to be updated only by the processing device, wherein the processing device may further include a memory access unit operable to access the first memory or the second memory, based on an access request, each time the processor makes the access request, the output unit may transmit the access request to the memory access unit, when the input unit judges affirmatively, the input unit may transmit, to the memory access unit, an access request to write the external data in one of the storage areas shown by one of the addresses that corresponds to the block identifier pertaining to the judgment, the memory access unit is accessible to the first memory in parallel with the second memory, and in a case of receiving the access request from the input unit and the access request from the output unit, when the storage area pertaining to the access request from the output unit is identical with a storage area in the first memory, the memory access unit may access the first memory, based on the access request from the output unit, in parallel with the second memory, based on the access request from the input unit.

Thus, with the stated structure, the access request outputted from the processor of the processing device with regard to the shared data updated only by the processing device cannot possibly contend with the access request to write data outputted from the external processing device to be shared with the processing device. Accordingly, the access contention can be further reduced.

The processing device may further includes: a buffer memory storing therein the data outputted from the one of the external processing devices, wherein when receiving an access request to access a storage area in the second memory, the memory access unit may access the second memory or the buffer memory, according to whether the storage area in the second memory is identical with a storage area in the second memory storing therein the data having written in the buffer memory.

Thus, with the stated structure, even if the access request from the processor is to access data in the second memory, when the data pertaining to the access request is stored in the buffer memory, the processing device pertaining to the present invention can access the buffer memory. Accordingly, in this period, the processing device can write data to be shared with the processing device in the shared data storage unit. That is to say, the access contention can be further reduced.

To solve the above problem, the present invention provides a processing system having a plurality of processing devices being connected via a common bus for sharing data with one another, wherein each processing device includes: a processor; a shared data storage unit that stores, respectively in one or more storage areas thereof, one or more data blocks to be shared with one or more different processing devices; an output unit operable to output, to the common bus, when the processor makes an access request to write data in a part of one of the data blocks, (a) a block identifier identifying the one of the data blocks, and (b) the data pertaining to the access request; and an input unit operable to judge whether to share external data outputted from a different processing device to the common bus, based on a block identifier outputted from the different processing device, and when judging affirmatively, to cause the shared data storage unit to store the external data.

With the stated structure, each processing device in the processing system pertaining to the present invention can cause the shared data storage unit to store only external data that is outputted from other processing devices and that is to be shared with the processing device itself, which can prevent wasteful consumption of a storage area in the shared data storage unit caused by storing unnecessary data. Since the shared data storage unit does not store the unnecessary data, the access request to write external data that is outputted from a different processing device and that is unnecessary for the processor of the processing device is prevented from contending with an access request outputted from the processor with regard to the shared data storage unit.

In addition, each processing device in the processing system pertaining to the present invention outputs data to be shared with other processing devices, and as described above, causes the shared data storage unit to store only the data to be shared with the processing device. Thus, the processor needs no processing to share data, being able to concentrate on predetermined processing.

Each processing device may further includes: a management information storage unit that stores therein, in one-to-one correspondence, block identifiers of the data blocks stored in the storage areas and addresses of the storage areas, wherein when the processor makes the access request to write the data in one of the storage areas shown by one of the addresses, the output unit may output, to the common bus, the block identifier, the data pertaining to the access request, and a device identification corresponding to the block identifier, when one of the block identifiers stored in the management information storage unit is identical with the block identifier outputted from the different processing device, the input unit judges affirmatively and may cause the external data to be written in one of the storage areas shown by one of the addresses that corresponds to the identical block identifier, and a processor of one of the processing devices may (i) generate information to be written in the management information storage unit by executing a predetermined program and (ii) cause the information to be written in each processing device.

Thus, a processor of one of the processing devices in the processing system pertaining to the present invention generates each information piece to be stored in the management information storage unit. Accordingly, each information piece can be uniformly generated, and therefore can be easily managed.

BRIEF DESCRIPTION OF THE DRAWINGS

FIGS. 4A and 4B each show a data configuration and an exemplary content of an output management information table 180 and an input management information table 190;

FIG. 10 shows an exemplary content of the output management information table 180 stored in each computer pertaining to Application Example 1;

FIG. 11 shows an exemplary content of the input management information table 190 stored in each computer pertaining to Application Example 1;

FIGS. 13A and 13B respectively show data placement in memory of the digital broadcasting receiver 1000A pertaining to Application Example 2 and the digital broadcasting receiver 10A for sharing data by a conventional method;

FIGS. 14A and 14B respectively show an exemplary content of the output management information table 180 and that of the input management information table 190 stored in each computer pertaining to Application Example 2;

FIGS. 18A and 18B respectively show an exemplary content of the output management information table 180 and that of the input management information table 190 stored in the computer pertaining to Application Example 3;

FIGS. 21A, 21B, 21C, 21D and 21E each show an exemplary content of the output management information table 180 or the input management information table 190 stored in the computer pertaining to Application Example 4;

FIGS. 22A, and 22B respectively shows an exemplary content of the output management information table 180 and that of the input management information table 190 stored in each computer in a stationary time pertaining to a modification of Application Example 4, and FIG. 22C shows operation of each computer;

FIGS. 23A, 23B and 23C respectively shows data placement in each memory and an exemplary content of the output management information table 180 and that of the input management information table 190 pertaining to Application Example 5.

FIGS. 28A and 28B respectively show an exemplary content of the output management information table and that of the input management information table 190 stored in each computer pertaining to Modification;

REFERENCE NUMERALS

Figure 1:
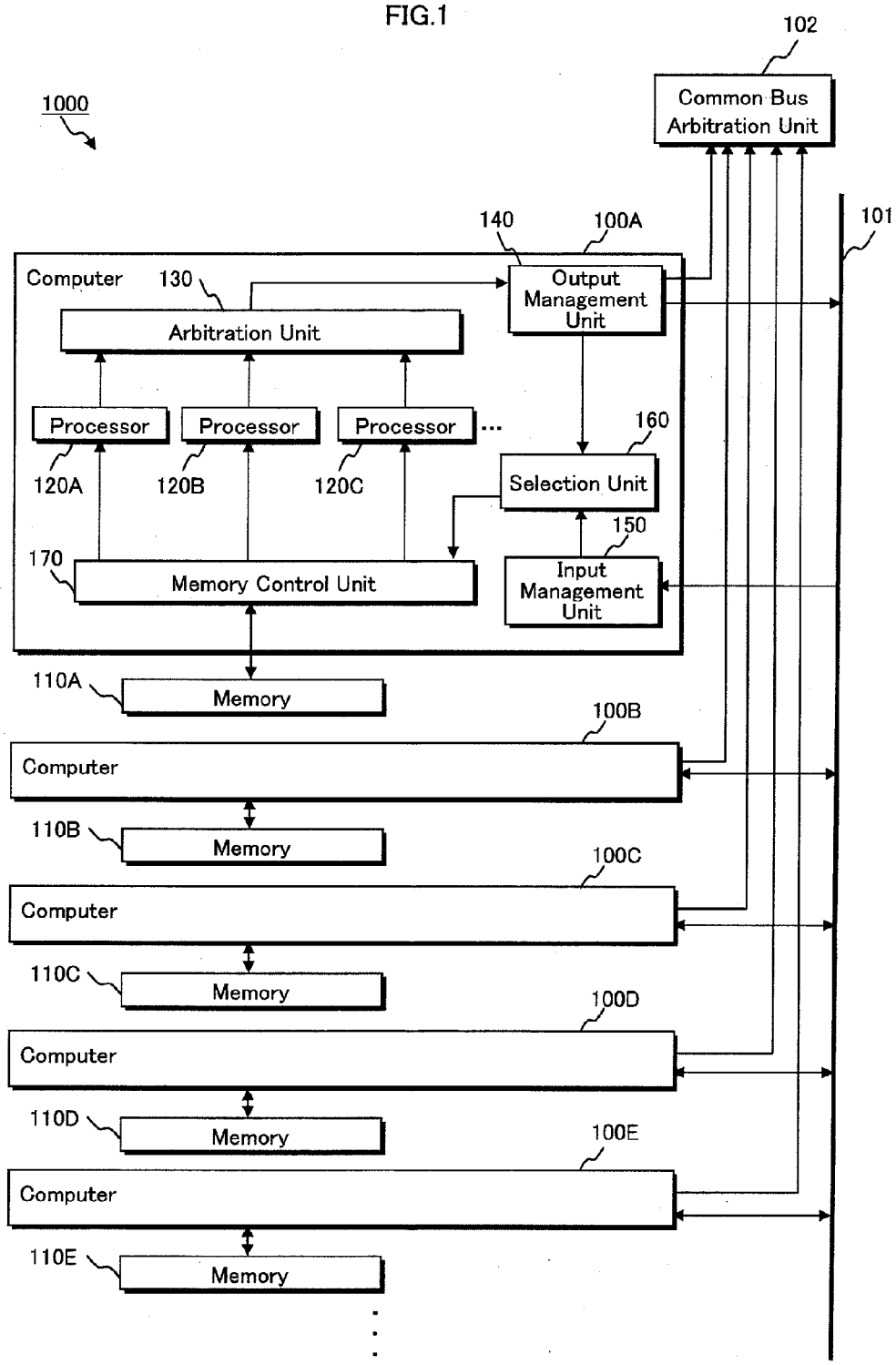
FIG. 1 is a system configuration diagram of a processing system 1000 pertaining to Embodiment 1.

100A-E, 200A-C, 300A-C, 400A-C, 500A-C computer
101 common bus
102 common bus arbitration unit
110A-E memory
120A-C processor
130 arbitration unit
140 output management unit
141 output management information retention unit
142 internal bus control unit
143 output judgment unit
144 common bus control unit
150 input management unit
151 input management information retention unit
152 input judgment unit
153 internal bus control unit
160 selection unit
170 memory control unit
210 buffer
220 shared data control unit
310A-C inherent memory
320A-C shared memory
330 memory selection control unit
340 inherent memory control unit
350 shared memory control unit
410 memory selection control unit 1000, 1100, 1200, 1300 processing system
1000A digital broadcasting receiver

DETAILED DESCRIPTION OF THE INVENTION

The following describes embodiments of the present invention with reference to the drawings.

Embodiment 1

Configuration

Firstly, a description is given of a configuration of processing system 1000 pertaining to Embodiment 1.

FIG. 1 is a system configuration diagram showing the processing system 1000 pertaining to Embodiment 1.

As shown in FIG. 1, the processing system 1000 includes computers 100A-100E connected to each other via a common bus 101, memories 110A-110E connected in one-to-one-correspondence with the computers, and a common bus arbitration unit 102.

FIG. 1 shows five computers (100A-100E). Note that the number of the computers shown in FIG. 1 is merely an example. The computers may be provided in any number as long as the number is two or more. In addition, FIG. 1 shows an example where the computers are connected in one-to-one correspondence with the memories. However, each computer may be connected to two memories or more. These features also apply to the embodiments provided below.

Here, the common bus 101 is a bus by which the computers communicate the shared data with one another. The common bus arbitration unit 102 arbitrates requests from the computers to use the common bus 101 so as to output the shared data.

Each memory (110A-110E) stores therein a program and data used by the processor in the computer connected to the memory. This data includes data used solely by the computer and data shared among the computers.

Each computer (100A-100E) executes predetermined processing, while sharing data with one or more other computers.

Since each computer has a similar configuration, a description is given of the computer 100A by way of example, as follows.

The computer 100A has processors 120A-120C, an arbitration unit 130, an output management unit 140, an input management unit 150, a selection unit 160, and a memory control unit 170.

Here, each processor (120A-120C) performs predetermined processing with use of data stored in the memory 110A by executing a predetermined program stored in the memory 110A. When the memory 110A needs to be accessed, a memory access request signal is transmitted to the arbitration unit 130.

This memory access request signal is a signal for designating an access type (read-out type or write type) and an address of a storage area in the memory 110A to be accessed. Particularly, when the access type is "write", write-target data is included.

The arbitration unit 130 arbitrates requests from respective processors to access the memory 110A. More specifically, the arbitration unit 130 selects one of memory access request signals received from the processors, and transmits the signal to the output management unit 140.

Note that, when the memory access request signal to be transmitted to the output management unit 140 is a read-out request signal for requesting reading out data from the memory 110A (i.e. a memory access request signal whose access type is a "read-out" type), the arbitration unit 130 transmits the read-out request signal as well as identification information of the processor that makes the request.

Hereinafter, when the memory access request signal is a read-out request signal, the read-out request signal and identification information identifying a processor are collectively referred to as "memory access request signal etc.".

The output management unit 140 is a circuit for (i) transmitting the memory access request signal etc. received from the arbitration unit 130 to the selection unit 160 and (ii) outputting write-target data and identification information etc. of this data to the common bus 101 particularly, when this memory access request signal is a request signal to write the write-target data in the shared data (i.e. the memory access request signal whose access type is "write" type). Note that this output is performed after obtaining the right to use common bus 101 from the common bus arbitration unit 102. A detailed description of the configuration of the output management unit 140 is given later (see FIG. 2).

The input management unit 150 is a circuit for (i) judging whether the outputted write-target data is data to be shared with the computer, based on the identification information etc. of the write-target data outputted from the other computers (100B-100E) to the common bus 101, and (ii) according to a result of the judgment, transmitting a write request signal to write this data in the memory 110A to the selection unit 160. Note that, a detailed description of the configuration of the input management unit 150 is given later (see FIG. 3).

The selection unit 160 is a circuit for sequentially transmitting the memory access request signal etc. received from the output management unit 140 and a write request signal received from the input management unit 150 to the memory control unit 170. Particularly, when the signals are received from both of the management units, the selection unit 160 preferentially transmits the memory access request signal from the input management unit 150 to the memory control unit 170. That is to say, in this case, the processor is suspended from accessing the memory 110A.

The memory control unit 170 accesses the memory 110A, based on the memory access request signal etc. or the write request signal received from the selection unit 160.

Subsequently, a description is given of the configuration of the output management unit 140.

Figure 2:
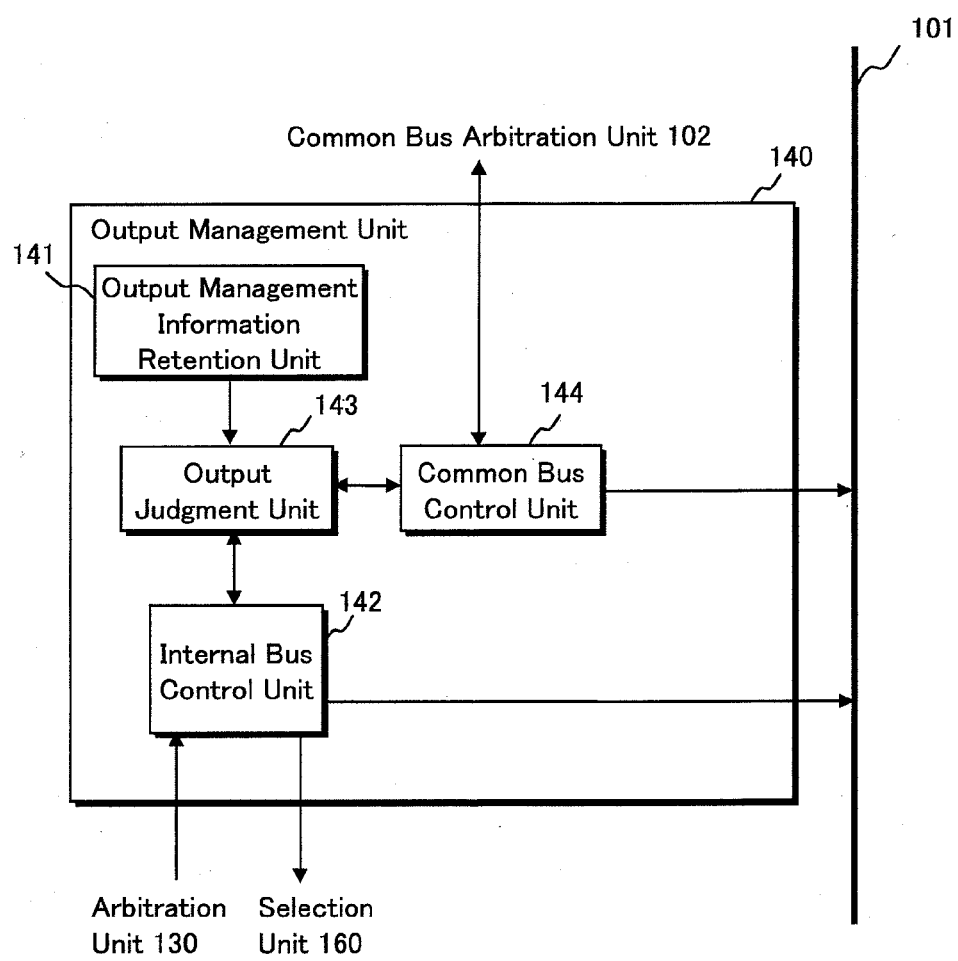
FIG. 2 is a functional block diagram of an output management unit 140.

FIG. 2 is a functional block diagram of the output management unit 140.

As shown in FIG. 2, the output management unit 140 includes an output management information retention unit 141, an internal bus control unit 142, an output judgment unit 143 and a common bus control unit 144.

Here, the output management information retention unit 141 is a memory area for storing therein the output management information table 180 (see FIG. 4A). A description is given later of the output management information table 180.

The internal bus control unit 142 has a function of transmitting the memory access request signal received from the arbitration unit 130 to the output judgment unit 143, a function of transmitting the memory access request signal etc. to the selection unit 160 according to an instruction from the output judgment unit 143, and a function of outputting the write-target data included in the memory access request signal to the common bus 101.

Based on the output management information table 180 stored in the output management information retention unit 141, the output judgment unit 143 judges whether the memory access request signal received from the internal bus control unit 142 is a request signal for writing data in the shared data. According to a result of the judgment, the output judgment unit 143 transmits a predetermined signal to a common bus control unit 144 or an internal bus control unit 142.

More specifically, when the memory access request signal is the request signal for writing data in the shared data, the output judgment unit 143 transmits identification information etc. of the write-target data to the common bus control unit 144. When the memory access request signal is not the request signal for writing the data in the shared data, the output judgment unit 143 transmits, to the internal bus control unit 142, a signal for instructing transmission of the memory access request signal etc. to the selection unit 160.

When the output judgment unit 143 receives, from the common bus control unit 144, an output completion signal which is later described, the output judgment unit 143 transmits a signal to the internal bus control unit 142. The signal is for instructing the transmission of the memory access request signal to the selection unit 160, and the output of the write-target data to the common bus 101.

Each time the common bus control unit 144 receives identification information etc. of the write-target data from the output judgment unit 143, the common bus control unit 144 obtains the right to use common bus 101 from the common bus arbitration unit 102, outputs this identification information etc. to the common bus 101, and transmits the output completion signal indicating completion of the output of this identification information etc. to the output judgment unit 143.

Subsequently, a description is given of the configuration of the input management unit 150.

Figure 3:
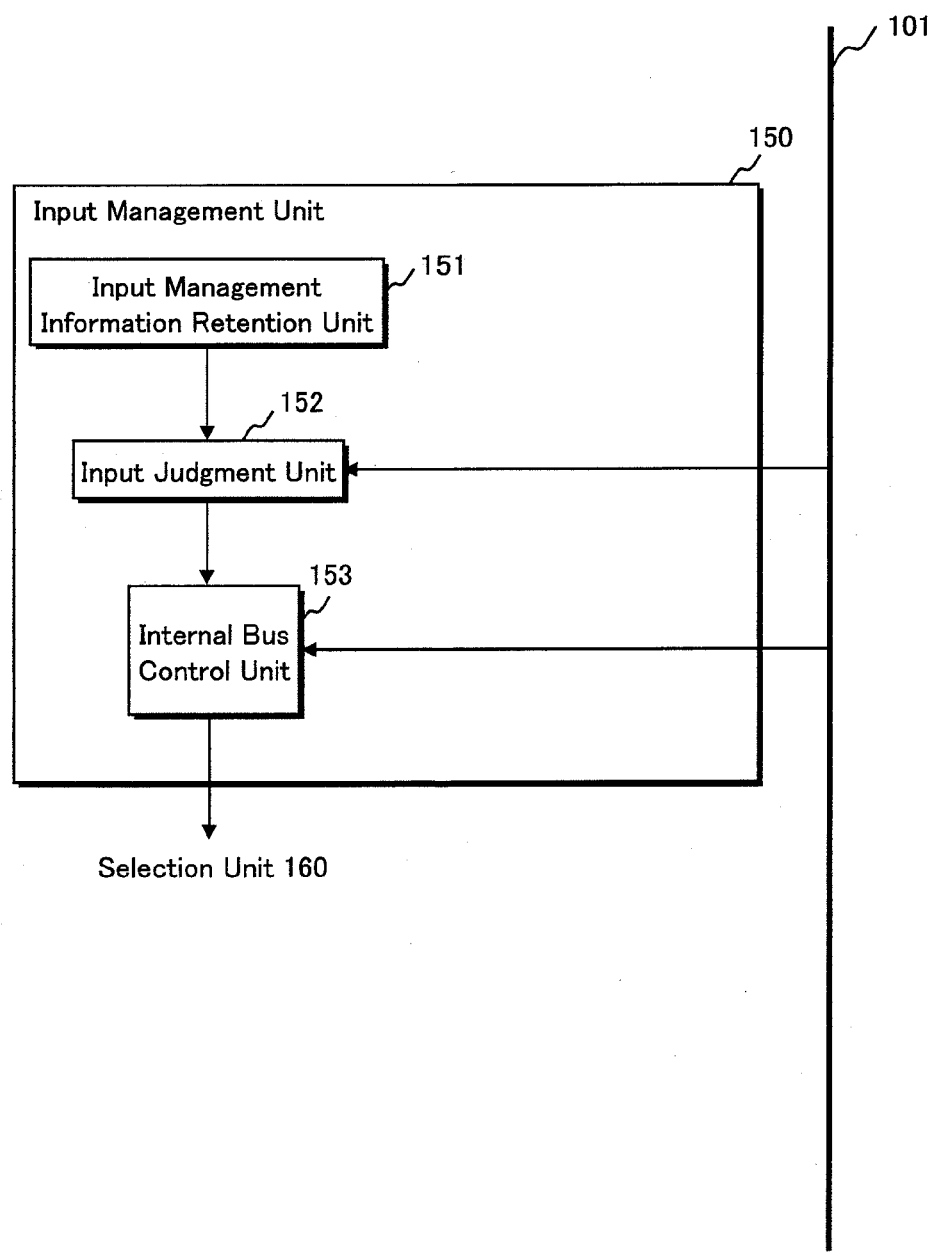
FIG. 3 is a functional block diagram of an input management unit 150.

FIG. 3 shows a functional block diagram of the input management unit 150.

As shown in FIG. 3, the input management unit 150 includes an input management information retention unit 151, an input judgment unit 152, and an internal bus control unit 153.

Here, the input management information retention unit 151 is a memory area for storing therein the input management information table 190 (see FIG. 4B). The input management information table 190 is described later.

The input judgment unit 152 judges whether the outputted write-target data is to be shared with the computer, based on the identification information etc. of the write-target data outputted from other computers (100B-100E) to the common bus 101 and the input management information table 190 stored in the input management information retention unit 151. Particularly, when the write-target data is to be shared with the computer, the input judgment unit 152 generates an access command signal for designating an access type (write type) and an address in the memory 110A on which this data is to be written, and transmits the signal to the internal bus control unit 153.

When the internal bus control unit 153 receives the access command signal from the input judgment unit 152, the internal bus control unit 153 receives the write-target data outputted from other computers to the common bus 101, and transmits the write request signal including this write-target data and the received access command signal to the selection unit 160.

<Data>

A description is given of data used by each computer, using the computer 100A as an example.

<Output Management Information Table>

First, a description is given of the output management information table 180.

FIG. 4A shows the data configuration and an exemplary content of the output management information table 180.

As shown in FIG. 4A, the output management information table 180 stored in the output management information retention unit 141 is information storing, for each shared data that is transmitted from the computer to other computers, a valid 181, a master ID 182, a data ID 183, a start address 184, and an end address 185 that are in correspondence with one another.

Hereinafter, valid, master ID, data ID, start address and end address being in correspondence with one another are collectively referred to as "output management information".

The output management information table 180 is used by the output judgment unit 143 for judging whether the memory access request signal from the processor in the computer is a memory access request signal for accessing the shared data.

Here, the valid 181 is information showing whether the output management information including the valid is valid or invalid. In this example, when it is valid, "1" is indicated, and when it is invalid, "0" is indicated. That is to say, the shared data corresponding to the output management information whose valid shows "1" is transmitted to the common bus 101.

The master ID 182 is identification information of a computer transmitting its corresponding shared data to the common bus 101. Hereinafter, a description is given that the master IDs of the computers 100A-100E indicate "0"-"4", for example.

Here, since an example of the output management information table 180 retained by the computer 100A is shown, all the master IDs indicate "0". With regard to the output management information table 180 retained by another computer, such as the computer 100B, all master IDs indicate "1".

The data ID 183 is identification information identifying its corresponding shared data, and does not match other data IDs.

The start address 184 and the end address 185 are information respectively indicating a start address and an end address of the storage area in the memory 110A in which its corresponding shared data is stored.

FIG. 4A shows the following case, for example. Data stored in the storage area whose start address is "0x0000", and whose end address is "0x00ff" in the memory 110A is shared data that is to be transmitted to another computer. The data ID of such shared data is "0", and the master ID of the computer (i.e. computer 100A) that outputs this data to the common bus 101 is "0".

The following describes an example of a method for registering data in the output management information table 180.

Data is registered in the output management information table 180 prior to the operation of the processing system 1000.

More specifically, when one processor inside an arbitrary computer in the processing system 1000 executes a program stored in the memory to which the computer is connected, output management information that is to be registered in the output management information table 180 stored in each computer is generated, and via a table-setting bus (unshown) that connects the computers, valid output management information is registered in the output management information table 180 stored in each computer (i.e. valid is "1"). This output management information is generated such that a combination of the master ID and the data ID does not match another combination of the master ID and the data ID.

As described above, each processor (120A-120C) performs predetermined processing with the use of data stored in the memory 110A, by executing a predetermined program stored in the memory 110A. Note that this predetermined program is configured to perform the predetermined processing with the use of the data stored in the storage area of the registered valid output management information (designated by the start address and the end address).

When one computer does not need to share data with another computer due to some reason, the setting for sharing data can be cancelled simply by updating the valid of the registered output management information corresponding to the shared data to "0". In addition, when the data needs to be shared again, the setting for sharing the data can be made simply by updating the valid of its corresponding output management information to "1".

<Input Management Information Table>

Subsequently, a description is given of the input management information table 190.

FIG. 4B shows the data configuration and an exemplary content of the input management information table 190.

As shown in FIG. 4B, the input management information table 190 stored in the input management information retention unit 151 is information storing, for each shared data to be received from another computer to the computer per se, a valid 191, a master ID 192, a data ID 193, a start address 194, and an end address 195 that are in correspondence with one another.

Hereinafter, the valid, the master ID, the data ID, the start address and the end address in correspondence with one another are collectively referred to as "input management information".

The input management information table 190 is used by the input judgment unit 152 for judging whether the write-target data outputted from other computers to the common bus 101 is to be received.

Since the input management information table 190 has a similar data configuration with the output management information table 180, a detailed description of each data is omitted. Note that out of shared data outputted from other computers to the common bus 101, shared data whose valid is "1" corresponding to the input management information is stored in the memory 110A.

FIG. 4B shows, for example, data whose master ID is "1" (i.e. computer 100B) and whose data ID is "0" is shared data that is to be received by the computer from another computer. FIG. 4B shows that this shared data is stored in a storage area of the memory 110A whose start address is "0x0000" and whose end address is "0x007f".

Note that since data registration in the input management information table 190 is performed similarly to the output management information table 180, a detailed description thereof is omitted.

<Operation>

Subsequently, a description is given of operation of each computer having the above configuration and handling the above data.

<Operation of Output Management Unit>

First, a description is given of output judgment processing performed by the output management unit 140.

Figure 5:
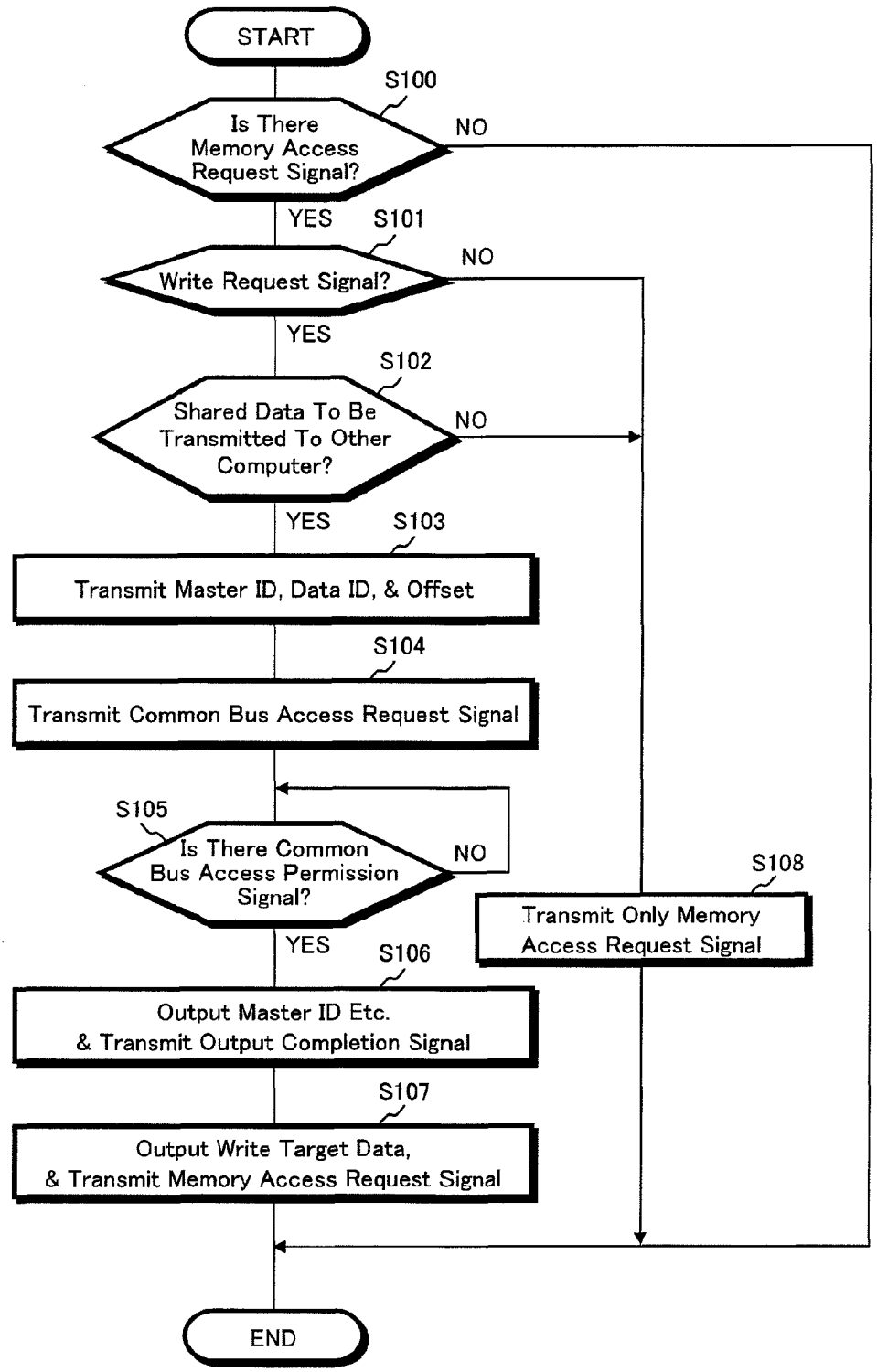
FIG. 5 is a flow chart showing output judgment processing by an output management unit 140.

FIG. 5 is a flow chart showing the output judgment processing by the output management unit 140.

Note that the following processing of Steps S100-S108 is repeated.

The output judgment unit 143 of the output management unit 140 judges whether the memory access request signal is received from the arbitration unit 130 via the internal bus control unit 142 (Step S100). When the signal is not received (Step S100: NO), the output judgment unit 143 terminates the output judgment processing without performing any further processing.

On the other hand, when the memory access request signal is received (Step S100: YES), the output judgment unit 143 judges whether the signal is a write request signal, based on an access type of the signal (Step S101). When the signal is a write request signal (Step S101: YES), the output judgment unit 143 judges whether the write request is to write data in the shared data to be transmitted to another computer, based on the output management information table 180 stored in the output management information retention unit 141 (Step S102).

More specifically, only when a write destination address in the memory 110A, in which data is written, included in the received signal falls within a range between the start address and the end address of the valid output management information the output management information table 180 (i.e. valid indicates "1"), the judgment is affirmative.

For example, when the write destination address is "0x0001" this address falls within a range between start address "0x0000" and end address "0x00ff", in the output management information table 180 shown in FIG. 4A, the judgment is affirmative. In addition, when the write destination address is "0x0400", and when this address does not fall within a range between the start address and the end address of any of the valid output management information pieces in the output management information table 180, the judgment is negative.

In Step S102, when a write request is to write data in the shared data that is to be transmitted to another computer (Step S102:YES), the output judgment unit 143 obtains a master ID and a data ID of its corresponding shared data from the output management table 180, and calculates an offset of the write destination address from the start address of the shared data (hereinafter, simply referred to as "offset"), and transmits the obtained master ID and data ID and the calculated offset to the common bus control unit 144 (Step S103).

For example, when the above write destination address is "0x0001", the master ID "0", the data ID "0", and the offset "0x001" are transmitted to the common bus control unit 144.

Subsequently, the common bus control unit 144 that receives the master ID etc. transmits a common bus access request signal to a common bus arbitration unit 102 in order to obtain the right to use common bus 101 (Step S104). The common bus arbitration unit 102 that receives this common bus access request signal arbitrates requests from the computers for transmitting data to the common bus 101, and transmits a common bus access permission signal indicating the right to use common bus 101 to the computer that transmits the common bus access request signal.

The common bus control unit 144 that transmits the common bus access request signal in Step S104 judges whether the common bus access permission signal is received from the common bus arbitration unit 102 (Step S105). When the common bus access permission signal is not received (Step S105: No), the processing of Step S105 is performed again.

On the other hand, when the common bus control unit 144 receives the common bus access permission signal (Step S105: YES), the common bus control unit 144 outputs the master ID, the data ID, and the offset received from the output judgment unit 143 to the common bus 101, and transmits an output completion signal indicating completion of the output of the master ID etc. to the output judgment unit 143 (Step S106).

The output judgment unit 143 that receives the output completion signal transmits, to the internal bus control unit 142, a signal for instructing the transmission of the memory access request signal to the selection unit 160 and the output of the write-target data to the common bus 101. The internal bus control unit 142 that receives this signal outputs the write-target data included in the memory access request signal to the common bus 101, and transmits this memory access request signal to the selection unit 160 (Step S107). Thus, the output judgment processing is completed.

On the other hand, when the signal is a read-out request signal in Step S101 (Step S101: NO), or when the write request is not to write the data in the shared data to be transmitted to another computer in Step S102 (Step S102: NO), the output judgment unit 143 transmits a signal for instructing the transmission of the memory access request signal etc. to the internal bus control unit 142. The internal bus control unit 142 receiving this signal transmits the received memory access request signal etc. to the selection unit 160 (Step S108), and the output judgment processing is completed.

<Operation of Input Management Unit>

Subsequently, a description is given of input judgment processing by the input management unit 150.

Figure 6:
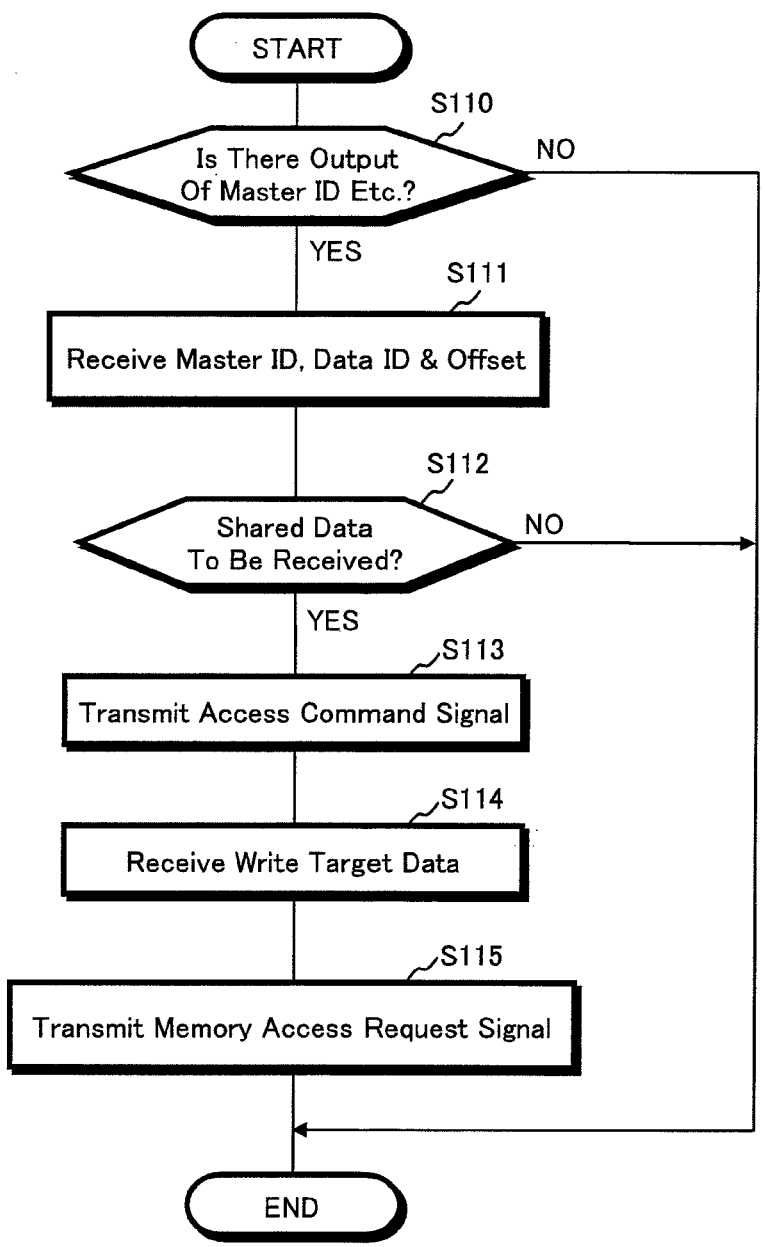
FIG. 6 is a flow chart showing input judgment processing by an input management unit 150.

FIG. 6 is a flow chart showing the input judgment processing by the input management unit 150.

Note that the following processing of Steps S110-S115 is repeated.

The input judgment unit 152 of the input management unit 150 judges whether the master ID etc. are outputted to the common bus 101 from another computers (Step S110). When the master ID etc. are not outputted (Step S110: NO), the input judgment processing is completed without performing any further processing.

On the other hand, when the master ID etc. are outputted (Step S110: YES), the input judgment unit 152 receives the outputted master ID, data ID, and offset (Step S111).

Based on the received master ID and data ID, the input judgment unit 152 judges the write-target data outputted from other computers to the common bus 101 is the shared data received by the computer (Step S112).

More specifically, with reference to the input management information table 190 stored in the input management information retention unit 151, only when input management information showing the correspondence between the received master ID and data ID is registered therein, the judgment is affirmative.

For example, when the received master ID and data ID are "1" and "0", respectively, corresponding input management information is registered in the input management information table 190 shown in FIG. 4B. Accordingly, the judgment is affirmative. In addition, for example, when the received master ID and data ID are "1" and "2", respectively, its corresponding input management information is not registered. Accordingly, the judgment is negative.

In Step S112, when the data is not the shared data to be received by the computer (Step S112: NO), the input judgment processing is completed. When the data is the shared data to be received by the computer (Step S112: YES), the input judgment unit 152 transmits the access command signal for designating an access type (write type) and a write destination address to the internal bus control unit 153 (Step S113). Here, the write destination address is obtained by adding (a) the start address included in its corresponding input management information, and (b) the received offset.

The internal bus control unit 153 that receives the access command signal (i) receives, from the common bus 101, the write-target data outputted from other computers, and (ii) transmits the memory access request signal including this write-target data and the received access command signal to the selection unit 160 (Step S115). Thus, the input judgment processing is completed.

<Operation of Selection Unit and Memory Control Unit>

Subsequently, a description is given of the transmission processing of the memory access request signal by the selection unit 160 and memory access processing by the memory control unit 170.

Figure 7:
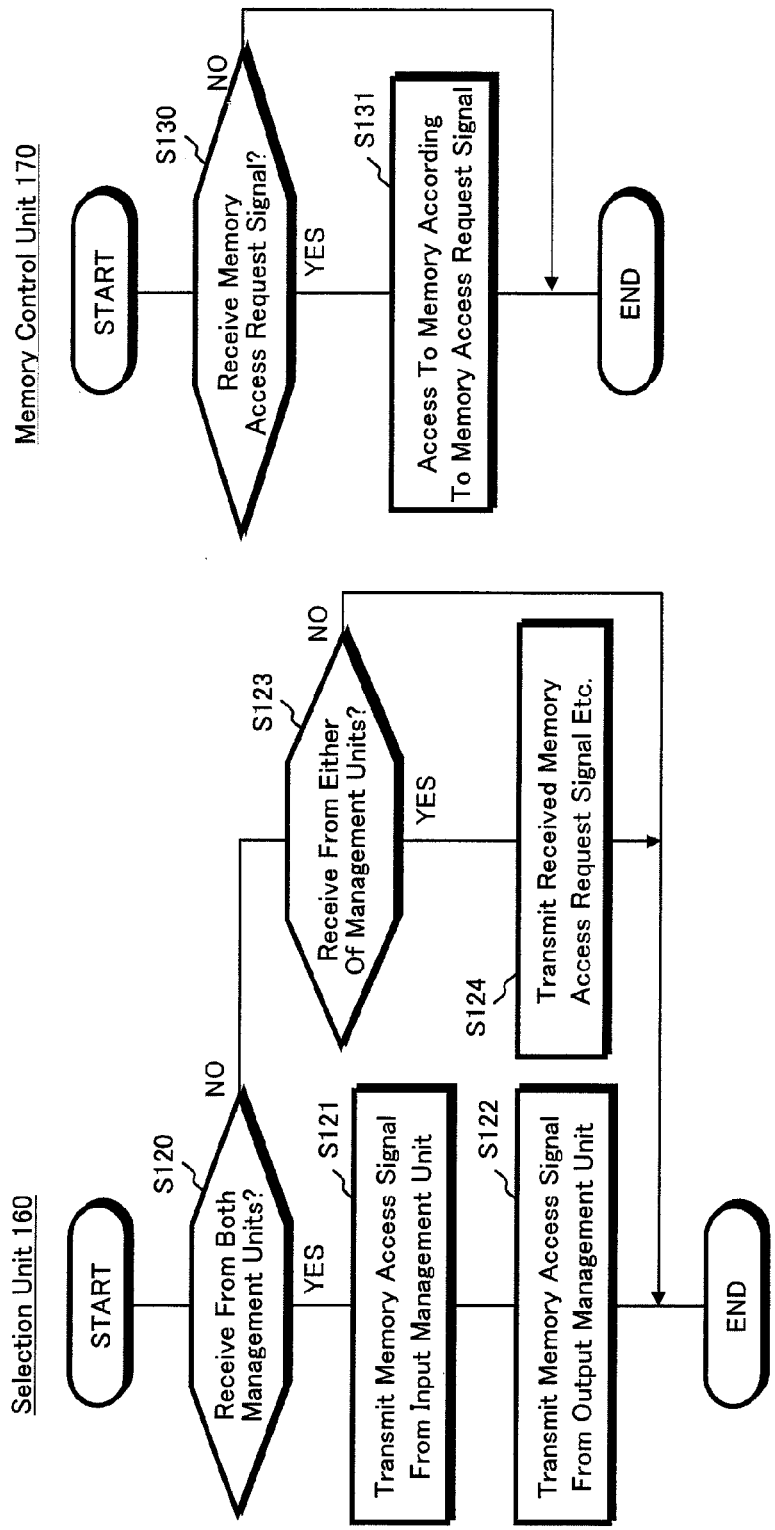
FIG. 7 is a flow chart showing transmission processing of a memory access request signal by a selection unit 160 and memory access processing by a memory control unit 170.

FIG. 7 is a flow chart showing the transmission processing of the memory access request signal by the selection unit 160 and the memory access processing by the memory control unit 170.

First, a description is given of the processing of the selection unit 160.

Note that the following processing of Steps S120-S124 is repeated.

The selection unit 160 judges whether the memory access request signals (the write request signal with regard to the input management unit 150) are received from the output management unit 140 and the input management unit 150 (Step S120). When they are received (Step S120: YES), initially, the memory access request signal from the input management unit 150 is transmitted to the memory control unit 170 (Step S121).

Subsequently, the selection unit 160 transmits the memory access request signal etc. from the output management unit 140 to the memory control unit 170 (Step S122), and the transmission processing of the memory access request signal is completed.

On the other hand, in Step S120, if the memory access request signal is received not from both of the output management unit 140 and the input management unit 150 (Step S120: NO), the selection unit 160 judges whether the memory access request signal is received from either of the output management unit 140 and the input management unit 150 (Step S123).

When the memory access request signal is received from neither of them (Step S123: NO), the transmission processing of the memory access request signal is completed. When the memory access request signal is received from either of them, (Step S123: YES), the received memory access request signal etc. are transmitted to the memory control unit 170 (Step S124). Thus, the transmission processing of the memory access request signal is completed.

Subsequently, a description is given of processing of the memory control unit 170.

Note that the following processing of Steps S130 and S131 is repeated.

The memory control unit 170 judges whether the memory access request signal (transmitted in the above Steps S121, S122, and S124) transmitted by the selection unit 160 is received (Step S130). When it is judged that the signal is not received (Step S130: NO), the memory access processing is completed without performing any further processing.

On the other hand, when the memory access request signal is received (Step S130: YES), according to the memory access request signal, data is readout from or write in a memory connected to the computer (Step S131), and the memory access processing is completed. Note that, in Step S131, when the memory access request signal is a read-out request signal, the memory control unit 170 transmits the read-out data to its corresponding processor, based on the received identification information of its corresponding processor.

Application Example 1

First, a description is given of an example in which the processing system 1000 pertaining to Embodiment 1 is applied to the digital broadcasting receiver 1000A having a function of decoding MPEG (Moving Picture Experts Group).

<Configuration>

Figure 8:
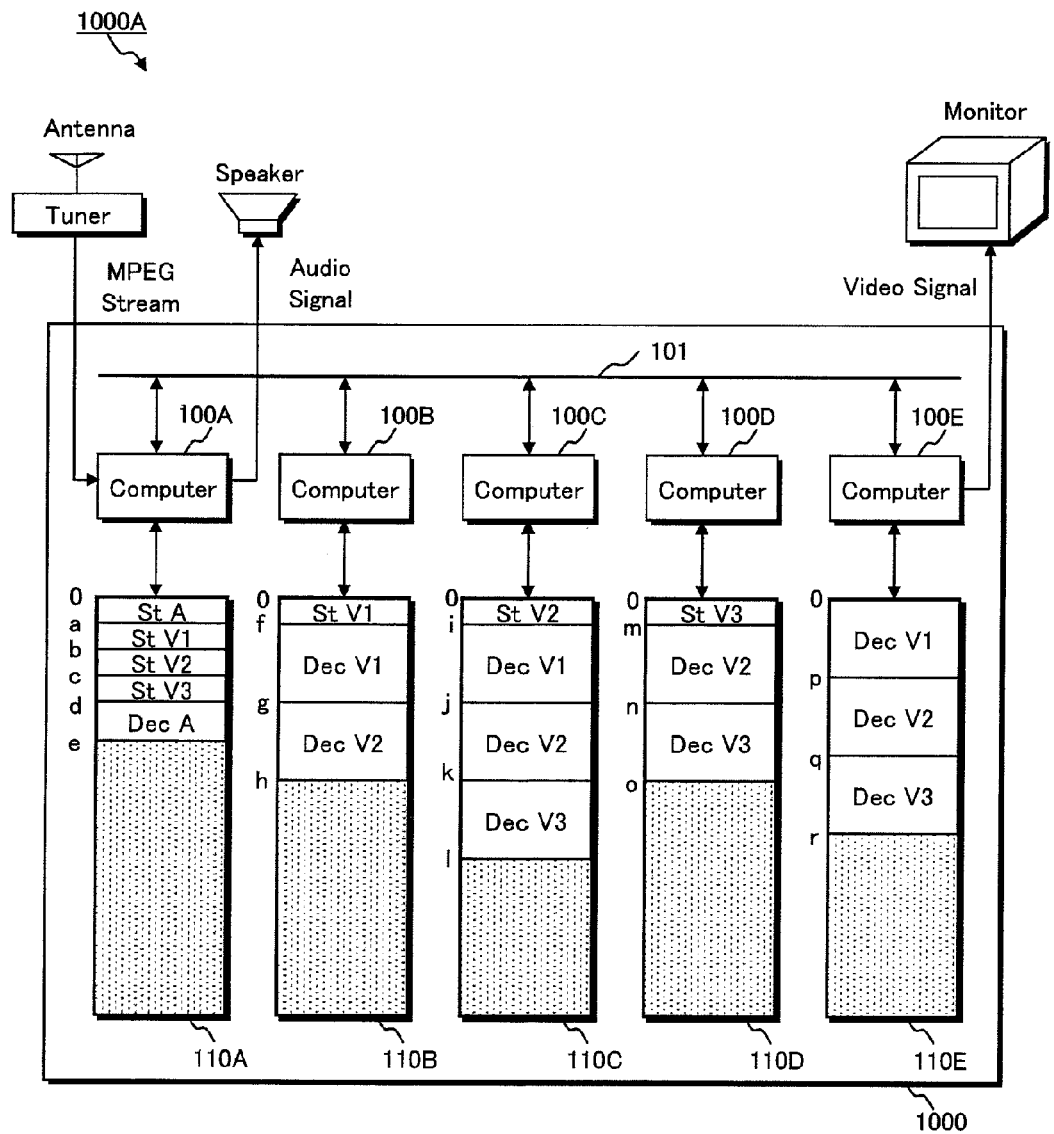
FIG. 8 is a configuration diagram of a digital broadcasting receiver 1000A pertaining to Application Example 1.

FIG. 8 is a configuration diagram of a digital broadcasting receiver 1000A pertaining to Application Example 1.

As shown in FIG. 8, the digital broadcasting receiver 1000A includes the processing system 1000, an antenna, a tuner, a speaker, a monitor etc.

Note that, hereinafter, to simplify the description, the description is given on the following assumption. Each computer has only one processor 120A. The arbitration unit 102's arbitration of the right to use common bus 101 is not particularly referred (omitted in FIG. 8).

Here, the processor 120A in each computer (100A-100E) executes a program stored in an inherent area (storage area having stored therein other data than the shared data; this area is represented by a hatching portion in each memory shown in FIG. 8) of the memory (110A-110E) to which the computer is connected. Thus, each computer realizes the following function.

That is to say, the computer 100A extracts MPEG stream (coded stream) received from the antenna via the tuner, into audio data and video data, decodes the audio data, and outputs the decoded audio data to the speaker.

The computers 100B-100D each decode the video data divided by the computer 100A.

Figure 9:
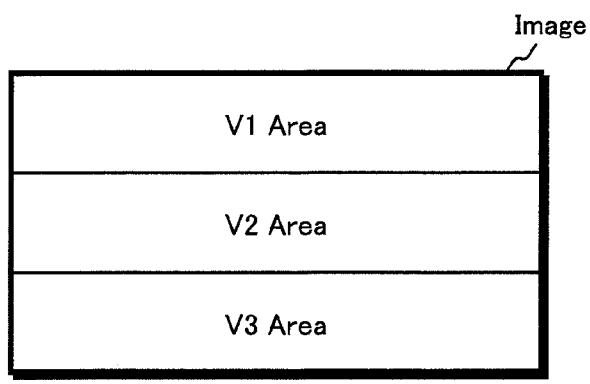
FIG. 9 shows an area in one image decoded by computers 100B-100D pertaining to Application Example 1.

Generally, decode processing of video data requires a larger amount of calculation and processing data than audio data. Accordingly, in this application example, the three computers 100B-100D share the decode processing of the video data. More specifically, as shown in FIG. 9, one image (frame) is divided equally into three in a vertical direction, and the divided areas V1, V2 and V3 are decoded by the computers 100B, 100C, and 100D, respectively.

The computer 100E displays, on the monitor, the video data having decoded by the computers 100B-100D.

<Data in Each Memory>

Subsequently, based on FIG. 8, a description is given of data stored in each memory.

In FIG. 8, the number 0 and the alphabets on the left side of each memory shows an address value in each memory. For example, the address value of StA in the storage area in the memory 110A shows an address of from 0 to a −1. In this application example, a description is given on assumption that each data is stored from "0" address of the memory. Note that this is merely an example, and that each data may be stored in an arbitrary address. This also applies to other application examples provided later.

StA in the memory 110A is audio data extracted from the MPEG stream received by the computer 100A. DecA is audio data into which the computer 100A has decoded StA.

The StV1, StV2, StV3 in the memory 110A are the video data extracted from the MPEG stream received by the computer 100A is divided in correspondence with the areas (areas V1-V3).

The computers 100B-100D decode the divided video data. Thus, the computers 100B-100D need to share the divided video data processed by the computer with the computer 100A. Accordingly, as shown in FIG. 8, the memory 110B stores therein StV1, the memory 110C stores therein StV2, and the memory 110D stores therein StV3.

The DecV1 in the memory 110B shows the divided video data into which the computer 100B has decoded StV1 in the memory 110B. In addition, DecV2 in the memory 110C and DecV3 in the memory 110D shows divided video data that is a resultant of decoded StV2 and StV3 by the computers 100C and 100D.

Since the computer 100E causes the data to be displayed on the monitor, based on the divided video data having decoded, this divided video data needs to be shared with the computers 100B-100D. Accordingly, as shown in FIG. 8, the memory 110E stores therein DecV1, DecV2, and DecV3.

Generally, in decoding a video stream in MPEG, it is necessary to refer to decoded image data for motion compensation processing, deblocking filter processing or the like.

Thus, as described above, when one image divided into three areas (areas V1-V3) is decoded by the three computers 100B-100D, respectively, it is occasionally necessary to refer to an image having decoded by other computers. That is to say, the decoded image data is required to be shared among the three computers 100B-100D.

Here, for decoding the areas (areas V1-V3) respectively allocated to the computers 100B-100D, a maximum value of a motion vector defined by a profile and a level designated upon encoding generally determines a range of a decoded image to be referred to. However, to simplify the description, the description is given on the assumption that divided images in all adjacent areas are referred.

Accordingly, as shown in FIG. 8, the memory 110E stores therein DecV2, the memory 110C stores therein DecV1 and DecV3, and the memory 110C stores therein DecV2.

<Management Information Table>

Subsequently, a description is given of an exemplary content of each of the output management information table 180 and the input management information table 190 retained by each computer.

FIG. 10 shows an exemplary content of the output management information table 180 stored in each computer pertaining to Application Example 1.

For example, the output management information 186 in the output management information table 180 in the computer 100A shown in FIG. 10 shows that shared data (i.e. StV1) stored in a storage area in the memory 110A whose start address is "a" and whose end address is "b−1" has a data ID "0", and a computer (i.e. computer 100A) that transmits this shared data has a master ID "0".

By setting the output management information table 180 stored in each computer as shown in FIG. 10, the computer 100A outputs the data as well as its corresponding master ID etc. to the common bus 101 when the StV1, StV2 and StV3 are written in the memory 110A.

When the computer 100B writes DecV1 in the memory 110B, when the computer 100C writes DecV2 in the memory 110C, when the computer 100D writes DecV3 in the memory 110D, the computers 110B-110D output the data as well as their corresponding master IDs etc. to the common bus 101.

FIG. 11 shows an exemplary content of the input management information table 190 stored in each computer pertaining to Application Example 1.

For example, the input management information 196 of the input management information table 190 stored in the computer 100B shown in FIG. 11 shows data (i.e. StV1) whose master ID is "0" (i.e. computer 100A) and whose data ID is "0" is shared data to be received from another computer to the computer, and that this shared data is stored in a storage area in the memory 110B whose start address is "0" and whose end address is "f−1".

By setting the input management information table 190 in each computer as shown in FIG. 11, the computer 100B writes the StV1 in a corresponding area (address from 0 to f−1) in the memory 110B when the StV1 is outputted to the common bus 101. Similarly, when DecV2 is outputted, the computer 100B writes DecV2 in a corresponding area in the memory 110B.

In addition, similarly, when StV2, DecV1, and DecV3 are outputted to the common bus 101, the computer 100C writes them in their corresponding areas in the memory 110C. When StV3 and DecV2 are outputted, the computer 100D writes them in their corresponding areas in the memory 110D. When the DecV1, DecV2, and DecV3 are outputted, the computer 100E writes them in their corresponding areas in the memory 110E.

By setting the output management information table 180 and the input management information table 190 in each computer as described above, only the shared data necessary to be processed by each computer can be retained in each memory, with the identity of the shared data being maintained.

<Comparison with Conventional Method>

The following describes data retained in each memory of a digital broadcasting receiver 10A in which computers share data with one another with the use of a conventional method (method of Patent Document 1 etc.).

Figure 12:
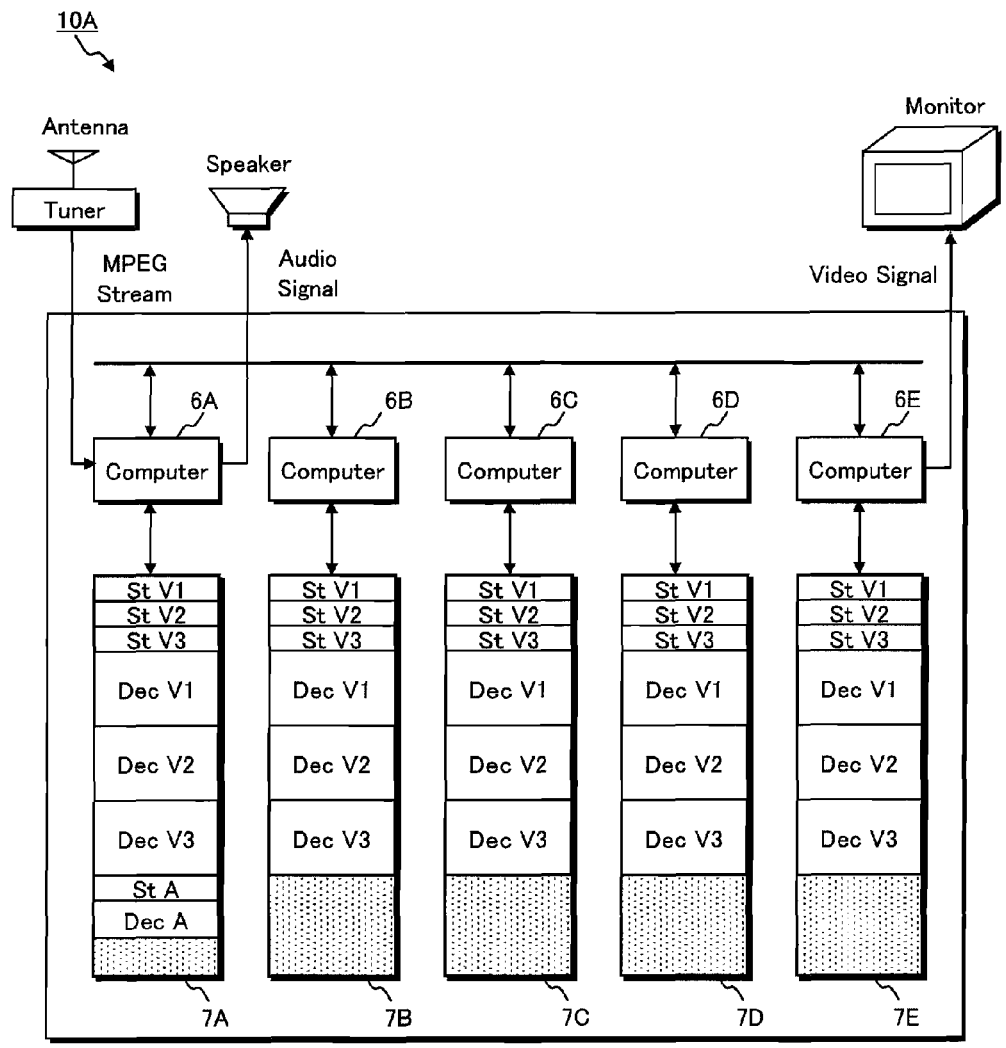
FIG. 12 is a configuration diagram of a digital broadcasting receiver 10A of which computers share data by a conventional method.

FIG. 12 is a configuration diagram of the digital broadcasting receiver 10A in which computers share data with one another with the use of the conventional method.

Functions of the computers 6A-6E shown in FIG. 12 are similar to those of the above-mentioned computers 100A-100E. The memories 7A-7E are similar to the above-mentioned memories 110A-110E.

According to the conventional method, since all shared data necessary for the entire system is stored in all the memories, as shown in FIG. 12, the shared data (StV1, StV2, StV3, DecV1, DecV2, and DecV3) of the entire system is stored in each memory.

As a result, a storage area of each memory is wastefully consumed by data not used by the computer connected to the memory. For example, a storage area of the memory 7B is uselessly consumed by StV2, StV3, and DecV3 that are not used by the computer 6B.

For example, when the computer 6A writes StV2 in the memory 7A, this StV2 is written in all the memories. Consequently, access contention is more likely to occur among the computers connected to the memories.

On the other hand, according to the above-mentioned digital broadcasting receiver 1000A pertaining to Application Example 1, since each computer causes only necessary data to be stored in the memory, the storage area is not wastefully consumed (see FIG. 8), or useless access contention does not occur.

Application Example 2

Subsequently, a description is given of an example where the method for sharing data with computers according to Embodiment 1 is applied to synchronization control of the computers of the above-mentioned digital broadcasting receiver 1000A.

Here, the synchronization control means controlling the entire system by causing a plurality of computers to perform simultaneous execution of predetermined processing. For example, in the digital broadcasting receiver 1000A, the computers simultaneously perform (i) switch processing of decode streams as a result of channel switching and (ii) error concealment, such as a picture skip due to an error regarding a stream, a buffer flush and the like.

<Data in Each Memory>

First, a description is given of data stored in each memory.

FIG. 13A shows data placement in each memory in the digital broadcasting receiver 1000A pertaining to Application Example 2.

Note that a description is given that there are five computers (100A-100E) in the digital broadcasting receiver 1000A pertaining to Application Example 1. However, note that in the following example, the description is given that there are four computers 100A-100D in the digital broadcasting receiver 1000A has.

Here, Status flags 1-3 in the respective memories 110B-110D are each a flag indicating an execution status of the synchronization processing of the computers 100B-100D to which the memories 110B-110D are connected. In this example, a description is given that the status where the synchronization processing is not executed is indicated by "0", and that where the synchronization processing is executed is indicated by "1". Each computer starts the synchronization processing in response to the update of the Status flags 1-3 from "0" to "1", and when each computer completes the synchronization processing, the Status flags 1-3 are updated from "1" to "0".

The Start flag in the memory 110A is an activation flag to cause each computer to start the synchronization processing. End flags 1-3 are each a flag indicating an execution status of the synchronization processing of the computers 100B-100D. In this example, a description is given that a status where the synchronization processing is not executed is indicated as "0", and that where the synchronization processing is executed is indicated as "1".

The description is given that each flag is either "0" or "1". Note that, however, this is merely an example, and that the flag may indicate another value.

<Management Information Table>

Subsequently, a description is given of an exemplary content of the output management information table 180 and the input management information table 190 retained by each computer.

FIG. 14A shows an exemplary content of the output management information table 180 stored in each computer pertaining to Application Example 2.

By setting the output management information table 180 stored in each computer as shown in FIG. 14A, the computer 100A outputs the Start flag and its corresponding master ID etc. to the common bus 101 when the Start flag is written.

In addition, when the computers 100B-100D writes their respective Status flags 1-3, each of the computers 100B-100D outputs the data and its corresponding master ID etc. to the common bus 101.

FIG. 14B shows an exemplary content of the input management information table 190 stored in each computer pertaining to Application Example 2.

By setting the input management information table 190 stored in each computer as shown in FIG. 14B, the computers 100B-100D receive the Start flags when they are outputted to the common bus 101. The computers 100B-100D respectively write the received Start flags in an area of the Status flag 1 in the memory 110B, in an area of the Status flag 2 in the memory 110C, in an area of the Status flag 3 in the memory 110D.

In addition, when the computers 100B and 100C, 100D outputs the Status flags 1,2 and 3, respectively, the computer 100A receives these flags 1,2 and 3, and writes the flags 1-3 in the storage areas of the End flags 1,2 and 3 in the memory 110A.

<Operation>

The following is a detailed description of operation of each computer.

Figure 15A:
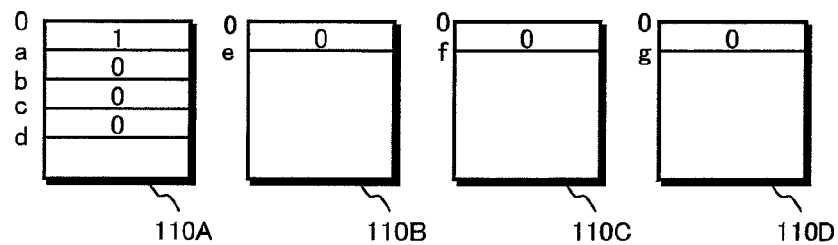
FIGS. 15A, 15B and 15C each show operation of the computer pertaining to Application Example 2.
Figure 15B:
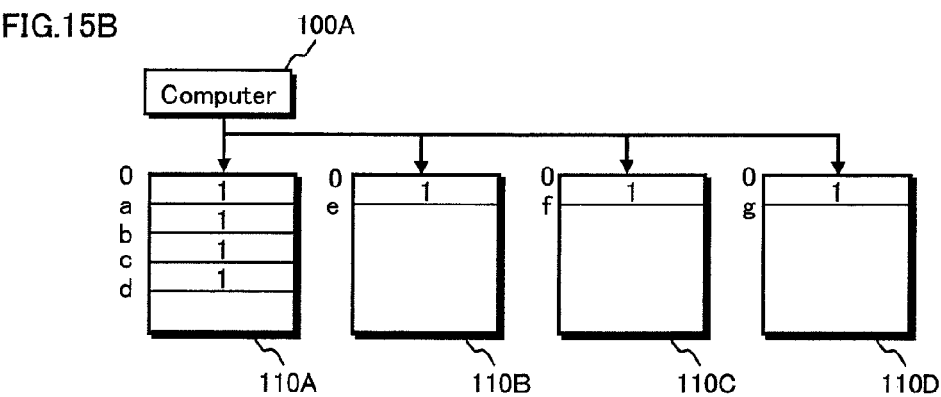
Figure 15C:
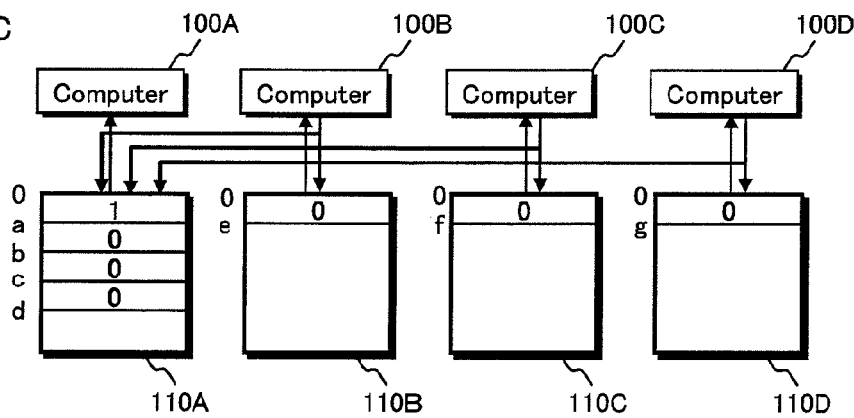

FIGS. 15A-15C show the operation of each computer pertaining to Application Example 2.

Note that, in FIG. 15, a flow of data is shown by an arrow, and written data out of data in each memory is shown by boldface. This also applies to each of the following application examples.

When the synchronization processing needs to be executed on the computers 100B-100D, the computer 100A first verifies that the End flags 1-3 stored in the memory 110A indicates "0", which is to say, that the computers 100B-100D are not executing the synchronization processing (see FIG. 15A).

Subsequently, to start the synchronization processing of the computers 100B-100D, the computer 100A writes "1" in the storage are of the Start flag in the memory 110A, and also outputs the Start flag "1" to the common bus 101, based on the output management information table 180 stored in the computer (master ID "0", data ID "0" and the like are also outputted).

Note that the computer 100A writes "1" in the area of each of the End flags 1-3 in the memory 110A.

Based on the master ID "0" and the data ID "0" outputted to the common bus 101 and the input management information table 190 stored in the computer, the computers 100E-100D each judge that this Start flag "1" is to be received, and writes "1" in the respective areas of the Status flags 1-3 in the memories 110B-110D (see FIG. 15B).

This writing cause each of the computers 100B-100D to start the synchronization processing. When the computers 100B-100D completes the synchronization processing, the computers 100B-100D write "0" in the Status flags 1-3 of the memories 110B-110D, respectively. In addition, based on the output management information table 180 stored in the computer, the computers 100B-100D output the Status flags 1-3 "0" to the common bus 101, respectively (similar to the above, the master ID, the data ID etc. corresponding to the outputted data are also outputted).

Based on the input management information table 190 stored in the computer 100A, the computer 100A judges that these Status flags 1-3 are received, and writes data in an area of each of the End flags 1-3 in the memory 110A (see FIG. 15C).

Lastly, the computer 100A verifies that the End flags 1-3 stored in the memory 110A each indicate "0", which is to say, that the computers 100B-100D completes the synchronization processing.

<Comparison with Conventional Method>

FIG. 13B shows data placement in each memory when each computer in the digital broadcasting receiver 10A sharing data with the use of a conventional method performs the synchronization processing.

In comparison to this, as shown in FIG. 13A, according to the digital broadcasting receiver 1000A, a storage area in each memory is not wastefully consumed nor written. Accordingly, wasteful access contention does not occur.

By setting the output management information table 180 and the input management information table 190 as shown above, when the computer 100A writes the Start flag "1" in the memory 110A, a plurality of computers 100B-100D are caused to start the simultaneous synchronization processing. According to the Status flags 1-3 respectively outputted from the computers 100B-100D, the computer 100A is notified of the completion of the synchronization processing in each computer. Thus, the synchronization control can be easily realized.

Note that in this application example, the description is given of the example where the computer 100A causes all the other computers (100B-100D) to perform the synchronization processing. However, note that it is possible to cause only some of the computers to perform the synchronization processing.

For example, in a case where the computers 100B and 100C, but not the computer 100D, are caused to perform the synchronization processing, and input management information with regard to the Status flag 3 in the input management information table 190 retained by the computer 100D may be set to be invalid (valid is set to "0").

In addition, in this application example, the description is given of the example where the computer 100A causes all the other computers (100B-100D) to start the synchronization processing at the same time point. However, the synchronization processing may be started at different time point.

For example, when the computers 100B and 100C starts the synchronization processing at the same time point T1, and the computer 100D starts it at a different time point T2, the computer 100A causes the memory 110A to store the Start flag 1 for the time point T1 and the Start flag 2 for the time point T2. The output management information table 180 stored in the computer 100A is so set that when the Start flags 1 and 2 are updated to "1", the Start flags 1 and 2 are outputted to the common bus 101.

The input management information table 190 stored in each computer is so set that the computers 100B and 100C each receive the Start flag 1 and that the computer 100D receives the Start flag 2. Note that, needless to say, the detail of the synchronization processing performed by the computers 100B-100D may be identical with or different from one another.

Application Example 3

Subsequently, a description is given of an application example where the processing system 1000 pertaining to Embodiment 1 is applied to a cooperative processing system where each computer performs processing using a process result obtained by other computers.

The description is given that the processing system 1000 has five computers (100A-100E). However, note that there are four computers 100A-100D in the cooperative processing system pertaining to this application example.

<Flow of Cooperative Processing>

Figure 16:
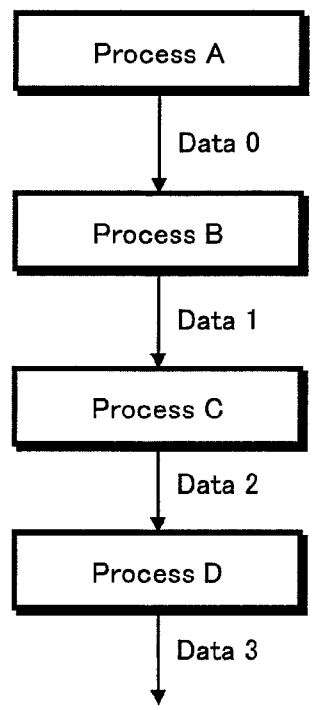
FIG. 16 shows a flow of cooperative processing in accordance with Application Example 3.

FIG. 16 shows a flow of cooperative processing pertaining to Application Example 3.

As shown in FIG. 16, this cooperative processing is performed in the stated order of processes A, B, C and D. Here, the processes B-D are performed with the use of a result obtained in the previous process (data 0-2).

Note that the following describes that the processes A-D are respectively performed by the computers 100A-100D. In addition, when the computer 100D completes the process D, the computer 100A starts the next process A.

<Data in Each Memory>

Figure 17A:
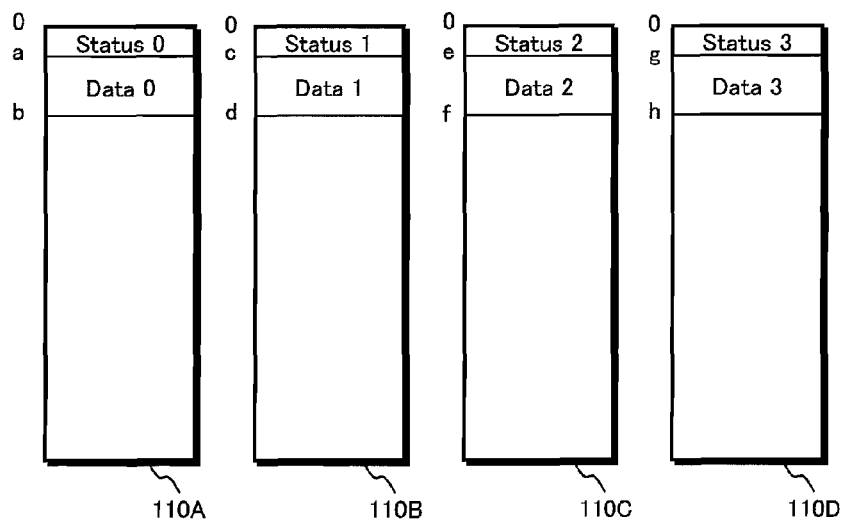
FIGS. 17A and 17B each show data placement in a memory of each computer pertaining to Application Example 3 and each computer performing cooperative processing by sharing data using the conventional method.

FIG. 17A shows data placement in each memory pertaining to Application Example 3.

Here, Status 0-3 in each memory are each an activation flag for starting a process corresponding to each computer. Each computer starts its corresponding process when this flag matches the master ID of the computer. When the process is completed, the master ID of a computer that performs the next process is written.

In addition, data 0-3 in the respective memories are generated by the processes A-D and correspond to data (data 0-3) shown in FIG. 16.

<Management Information Table>

FIG. 18A shows an exemplary content of the output management information table 180 stored in each computer pertaining to Application Example 3.

By setting the output management information table 180 in each computer as shown in FIG. 18A, when the computers 100A-100D write the Statuses 0-3 and the data 0-2 in each memory, each of the computers 100A-100D output them with its corresponding master ID etc. to the common bus 101.

FIG. 18B shows an exemplary content of the input management information table 190 stored in each computer pertaining to Application Example 3.

By setting the input management information table 190 stored in each computer as shown in FIG. 18B, the computers 100A-100C each write, in areas of Statuses 0-2 in the memories 110A-110C, Statuses outputted from the computers that performs the previous and the next processes. The computer 100D writes Status 2 outputted from the computer 100C that performs the process C before the process D performed by the computer in an area of the Status 3 in the memory 110D.

In addition, the computers 100B-100D write data outputted from the computer of its corresponding computer that performs the previous process in areas of data 1-3 in the memories 110B-110D, respectively.

<Operation>

FIG. 19 shows operation of each computer pertaining to Application Example 3.

Figure 19A:
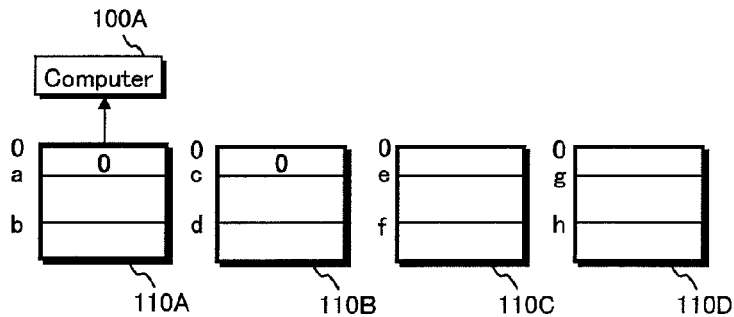
FIGS. 19A, 19B, 19C, 19D and 19E each show operation of the computer pertaining to Application Example 3.

First, the computer 100A refers to the area of Status 0 in the memory 110A, and starts the process A when the Status 0 matches the master ID "0" of the computer (see FIG. 19A).

After completing the process A, the computer 100A writes data 0 in a corresponding area of the memory 110A. In addition, based on the output management information table 180 stored in the computer, the computer 100A outputs the data 0 to the common bus 101 (master ID "0", data ID "1" etc. are also outputted).

Based on the master ID "0", data ID "1" outputted from the common bus 101 and the input management information table 190 stored in the computer, the computer 100B determined to receive this data 0, and writes the data 0 in an area of the data 1 in the memory 110B.

Subsequently, the computer 100A writes "1" in the area of the Status 0 of the memory 110A. In addition, based on the output management information table 180 stored in the computer, the computer 100A outputs Status 0 "1" to the common bus 101 (master ID "0", data ID "0" etc. are also outputted).

Figure 19B:
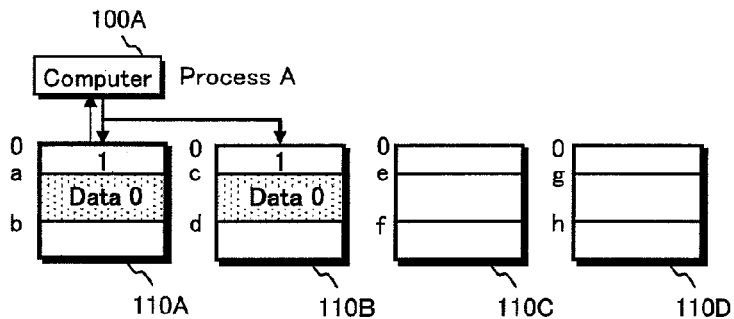

Based on the master ID "0", data ID "0" outputted to the common bus 101 and the input management information table 190 stored in the computer, the computer 100B judges to receive the Status 0 "1", and writes "1" in the area of Status 1 of the memory 110B (see FIG. 19B).

As a result, since the Status 1 matches the master ID "1" of the computer, the computer 100B starts the process B. When completing the process B, the computer 100B writes the data 1 in a corresponding area in the memory 110B. In addition, based on the output management information table 180 stored in the computer, the computer 100B outputs the data 1 to the common bus 101 (the master ID "1", the data ID "1" etc. are also outputted).

Based on the master ID "1", the data ID "1" outputted to the common bus 101 and the input management information table 190 stored in the computer, the computer 100C determines to receive this data 1, and writes the data 1 in an area of the data 2 of the memory 110.

Subsequently, the computer 100B writes "2" in the area of the Status 1 of the memory 110B, and based on the output management information table 180 stored in the computer, the computer 100B outputs the Status 1 "2" to the common bus 101 (the master ID "1", the data ID "0" etc. are also outputted).

Figure 19C:
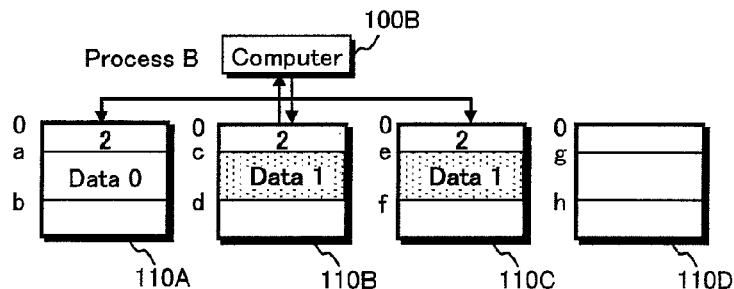
Figure 19D:
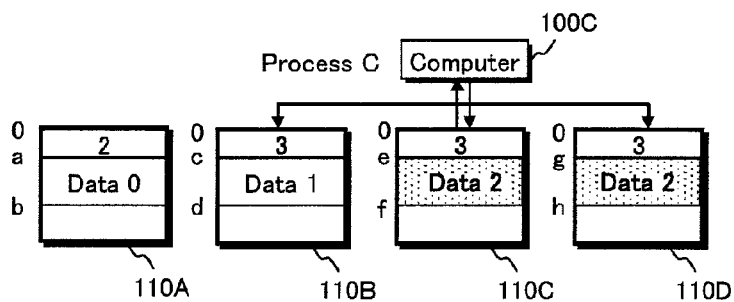
Figure 19E:
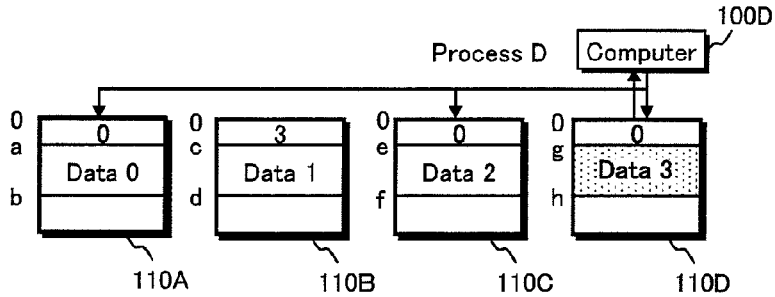

Based on the master ID "1", the data ID "0" outputted to the common bus 101 and the input management information table 190 stored in the computer, the computers 100A and 100C each determine to receive this Status 1 "2", and write "2" in the area of the Status 0 in the memory 110A and the area of the Status 2 in the memory 110C (see FIG. 19C).

Similarly, the computer 100C starts the process C. When completing this process C, the computer 100C writes the data 2 in a corresponding area in the memory 110C, and outputs the data 2 to the common bus 101. The computer 100D writes the data 2 in the area of the data 3 in the memory 110D. Subsequently, the computer 100C writes "3" in the area of the Status 2 in the memory 110C, and outputs "3" to the common bus 101. The computers 100B and 100D write this Status 2 "3" in the area of the Status 1 in the memory 110B and the area of the Status 3 in the memory 110D (see FIG. 19D).

Similarly, the computer 100D starts the process D. When completing this process D, the computer 100D writes the data 3 in a pertinent area in the memory 110D. Subsequently, the computer 100D writes "0" in the area of the Status 3 in the memory 110D, and outputs "0" to the common bus 101. The computers 100A and 100C writes this Status 3 "0" in the area of the Status 0 in the memory 110A and the area of the Status 2 in the memory 110C (see FIG. 19E).

Subsequent to that, since the Status 0 matches the master ID "0" of the computer, the computer 100A restart the process A.

<Comparison with Conventional Method>

Figure 17B:
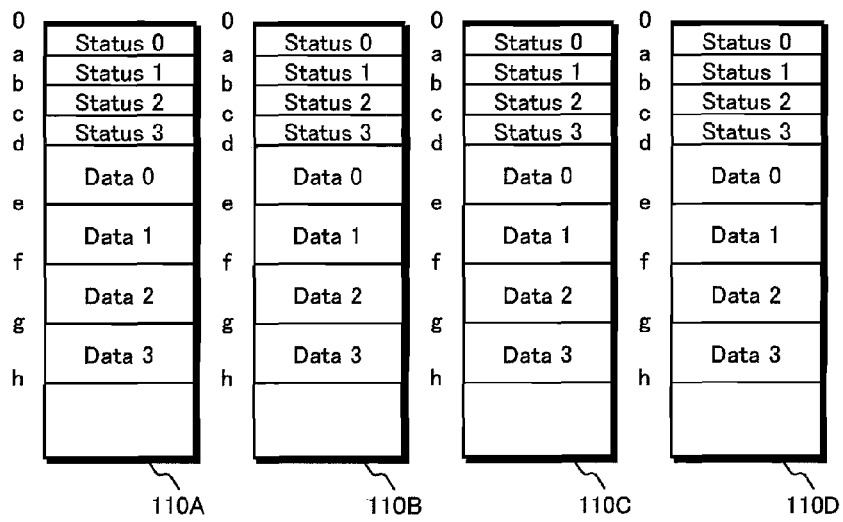

FIG. 17B shows data placement in each memory in the cooperative processing system in which cooperative processing is performed by sharing data with the use of the conventional method.

According to the cooperative processing system pertaining to Application Example 3 shown in FIG. 17A, compared with FIG. 17B, a storage area for shared data in each memory can be largely reduced, so that the storage area in each memory is not wastefully consumed, and memory access contention due to useless writing does not occur among the processors in the computer.

Note that in this application example, to simplify the description, the description is given of an example where the cooperative processing is performed in the stated order from the processes A to D, and where an area in each memory for storing therein a Status and a piece of data for one generation is provided. However, each computer may perform the process in parallel by storing Statuses and data pieces for a plurality of generations.

In this embodiment, the description is given that Status of the computer is shared with computers performing the previous and the next processes. However, the input management information table 190 may be set such that a Status can be shared with all the computers. Thus, each computer is notified of the computer currently executing the process by referring to the Status of the memory to which the computer is connected. Thus, process status of the entire system can be easily figured out.

Application Example 4

A description is given of an example where the computer 100E that is usually in an idle status is added to the above-mentioned cooperative processing system pertaining to Application Example 3, and where part of the processing of the computers 100B-100D is allocated to the computer 100E according to process loads of the computers 100B-100D.

FIG. 20 shows operation of each computer pertaining to Application Example 4.

With the use of FIG. 20, the following describes an operation example where the load of the process C performed by the computer 100C is increased so that this computer 100E shares part of the process C.

Note that FIG. 20 shows a status where the computer 100A completes the process A and after the data 0 is outputted to the common bus 101. The illustration of the computer 100A is omitted.

Figure 20A:
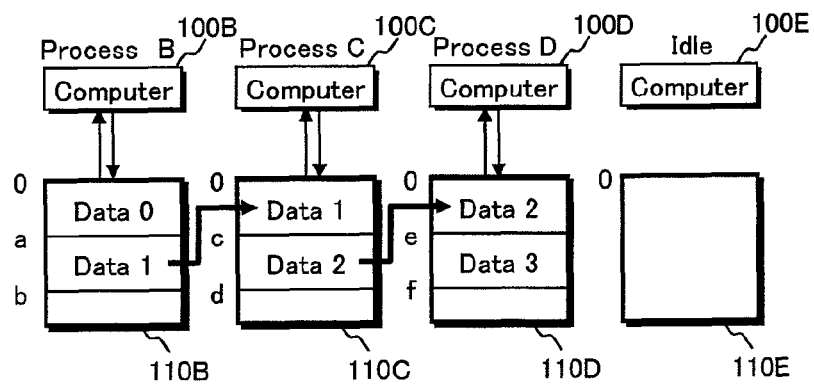
FIGS. 20A, 20B, and 20C each show operation of a computer pertaining to Application Example 4.

As shown in FIG. 20A, in stationary time, the computers 100B-100D respectively are performing the processes B-D, and the computer 100E is idle.

The description is given that each computer pertaining to Application Example 3 starts the process when the Status matches the master ID of the computer. However, note that in this Application Example 4, when the previous process result (data 0-2) is written, each computer starts the process. In addition, the previous process result and the process result of the computer are written in different areas.

FIG. 21A shows an exemplary content of the output management information table 180 stored in each computer in stationary time pertaining to Application Example 4.

Note that, in FIG. 21A, a description of the output management information table 180 stored in the computer 100A is omitted.

By setting the output management information table 180 stored in each computer as shown in FIG. 21A, when the data 1 and 2 are written, the computers 100B and 100C output the data 1 and 2 as well as the master IDs etc. corresponding to the data 1 and 2 to the common bus 101.

In addition, FIG. 21B shows an exemplary content of the input management information table 190 stored in each computer in stationary time pertaining to Application Example 4.

Note that in FIG. 21B, a description of the input management information table 190 stored in the computer 100A is omitted.

By setting the input management information table 190 stored in each computer as shown in FIG. 21B, the computers 100B-100D receive the data 0-2 when they are outputted to the common bus 101, and writes the data 0-2 in corresponding areas in the memories 110B-110D.

Compared with the status shown in FIG. 20A, when the process load of the process C performed by the computer 100C is increased (e.g., when processing time from a start to an end of the process C reaches predetermined time or longer), in order to cause the computer 100E being idle to execute part of the process C, as shown in FIG. 21C, one of the processors in the arbitrary computer (e.g., the processor 120A of the computer 100A) registers the input management information in the input management information table 190 stored in the computer 100E. Note that this registration is made in response to notification from, for example, the computer 100C notifying the load of the process C is increased.

Figure 20B:
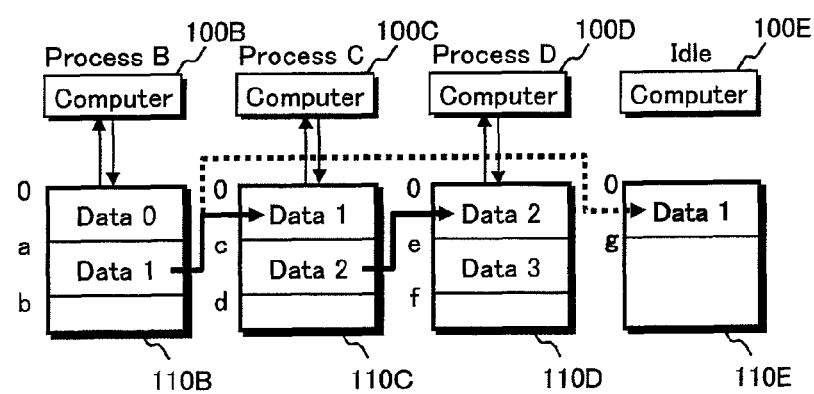
Figure 20C:
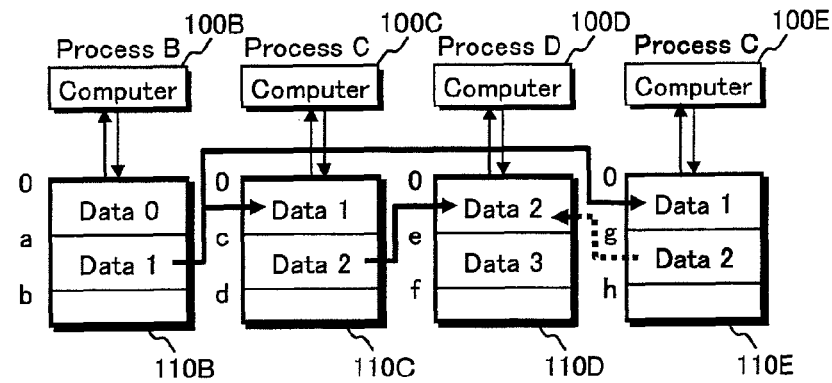

Thus, the computer 100E receives the data 1 outputted from the computer 100B to the common bus 101, and writes the data 1 in a corresponding area in the memory 110E (see FIG. 20B).

Subsequently, when the data 1 required for the process is accumulated in the memory 110E of the computer 100E, as shown in FIGS. 21D and 21E, the input management information 197 is registered in the input management information table 190 stored in the computer 100D, and the output management information of the computer 100E is registered.

Subsequently, the computer 100E starts the process C, and writes the data 2 in a corresponding area in the memory 110E. The computer 100E also outputs data 2 to the common bus 101, and the computer 100D receives the data 2 and writes this in an area of the data 2 in the memory 110D (see FIG. 20C).

Note that when the computers 100C and 100E share the process C, for example, with the use of a first-half portion of two portions of the divided data 1, the computer 100C performs the process C, and outputs the first-half portion of the data 2. With the use a last-half portion of the data 1, the computer 100E performs the process C, and outputs the last-half portion of the data 2. That is to say, the data 2 composed of the first-half portion outputted from the computer 100C and the last-half portion outputted from the computer 100E is written in a corresponding area in the memory 110D.

Described as above, each computer controls input and output of the shared data based on the input management information table 190 and the output management information table 180. Accordingly, without causing a great impact on other computers during the operation by updating this table as necessary, the number of computers provided in the cooperative processing system can be easily increased or reduced. This means that performance can be easily guaranteed in a system that realizes processing particularly requiring real-time performance.

When the number of the computers is increased, data does not need to be outputted to each computer. Thus, increase of a data amount on the common bus 101 can be prevented.

In stationary time, the computer 100E does not write, in the memory 110E, data outputted from other computers 100A-100C to the common bus 101. Accordingly, in stationary time, when the computer 100E is caused to execute a process that does not require data communication among the computers 100A-100D, the computer 100E can exclusively occupy a storage area in the memory 110E, and efficiently perform the process without causing access contention.

In this application example, the description is given that when the computers 100C and 100E share the process C, the data 2 generated by the other computer that shares the process C does not need to be referred. Note that, however, when the data 2 generated by other computers needs to be referred, as described in Application Example 1, by registering, in each of the computers 100C and 100E, the input management information that receives the data 2 outputted from other computers performing the shared process, the data 2 generated by other computers can be referred.

In this application example, the description is given of a case where the computers 100C and 100E share the process C. However, for example, when the computer 100C cannot be used due to a failure or the like, by a similar method, the execution of the process C by the computer 100C can be substituted by the computer 100E.

In this application example, the input management information table 190 stored in the computer 100E is set such that the computer 100E, in stationary time, does not receive the data 0-2 from other computers 100A-100C. However, the table may be set such that the computer 100E receives the data 0-2 in stationary time. The input management information table 190 stored in each of the computers 100C and 100D may be set such that the computers 100C and 100D receive the data 1, 2 and 3 from the computer 100E (see FIGS. 22A and 22B).

In this case, a flow of data among the computers is as shown in FIG. 22C.

Thus, newest data 0-2 generated by the computers 100A-100C is always reflected in the memory 110E of the computer 100E. Accordingly, when the computer 100E starts any shared process of the processes B-D, neither of the output management information table 180 and the input management information table 190 needs to be reset. Accordingly, shared process can be started at a higher speed.

Even when the input management information table 190 in each of the computers 100C and 100D is set as shown in FIG. 22B, till the computer 100E starts the shared process, the data 1, 2 and 3 are not outputted from the computer 100E to the common bus 101. Accordingly, the data element 1 is not written in the memory 110B, nor the data element 2 in the memory 110C, nor the data element 3 in the memory 110D. Accordingly, even when the above setting is made, till the computer 100E starts the shared process, a data amount in the common bus 101 is the same as that shown in FIG. 20, which does not influence other computers.

Application Example 5

Figure 23A:
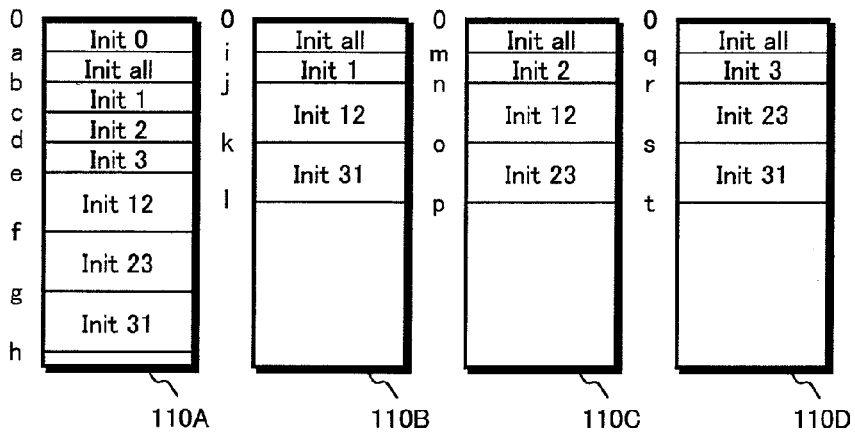

A description is given of an example where the data-sharing method described in Embodiment 1 is applied to initialization process among computers.
<Data Placement in Each Memory>
FIG. 23A shows data placement in each memory pertaining to Application Example 5.

Here, "Init all" in each memory is common initialization data used by the computers. Init 0-Init 3 are initialization data used solely by the computers 100A-100D, respectively. Init 12, Init 23, and Init 31 are initialization data used by the computers 100B and 100C, the computers 100C and 100D, and the computers 100B and 100D, respectively.
<Management Information Table>
FIG. 23B shows an exemplary content of the output management information table 180 stored in each computer pertaining to Application Example 5.

By setting the output management information table 180 stored in each computer as shown in FIG. 23B, when the computer 100A writes Init all, Init 1-3, Init 12, Init 23, and Init 31 in the memory 110A, the computer 100A outputs these Init all, Init 1-3, Init 12, Init 23, and Init 31 with their corresponding master IDs etc. to the common bus 101.

Note that since valid output management information is not registered in the output management information table 180 stored in other computers (100B-100D) (i.e., valid is "0", the illustration is omitted in FIG. 23B), the computers 100B-100D do not output data to the common bus 101.

FIG. 23C shows an exemplary content of the input management information table 190 stored in each computer pertaining to Application Example 5.

By setting the input management information table 190 stored in each computer as shown in FIG. 23C, the computer 100B writes Init all, Init 1, Init 12, Init 31, the computer 100C writes Init all, Init 2, Init 12, Init 23, and the computer 100D writes Init all, Init 3, Init 23, Init 31 in their corresponding areas in each memory (100B-100D).

Note that since valid output management information is not registered in the input management information table 190 stored in the computer 100A (i.e., although valid is "0", the illustration is omitted in FIG. 23B), the computer 100A does not write data outputted from other computers (100B-100D) to the common bus 101 in the memory 110A.

As described above, the output management information table 180 and the input management information table 190 stored in each computer are set. Accordingly, simply by writing of each initialization data (Init all, Init 1-3, Init 12, Init 23, Init 31) by the computer 100A in the memory 110A, initialization data used by other computers (100B-100D) are written in the memories 110B-110D. Therefore, the entire system can be initialized at a high speed.

In this application example, only the computer 100A writes the initialization data. Accordingly, for example, in a system where initialization data is retained by an external storage device, only the computer 100A may be connected to this external storage device.

That is to say, in a multiprocessor system, it is sufficient to provide an interface unit for being connected to an external storage device only in the computer 100A. Thus, the cost of the entire system can be reduced.

Embodiment 2

The description is given that when the selection unit 160 of each computer pertaining to Embodiment 1 receives both the memory access request signal from the output management unit 140 and the write request signal from the input management unit 150, the selection unit 160 preferentially transmits the write request signal from the input management unit 150 to the memory control unit 170.

Accordingly, memory access from a processor in the computer is suspended so that processing efficiency may be reduced.

In response to the above problem, the following describes an embodiment that is modified to enable high-speed memory access from a processor in the computer with use or a buffer provided in the computer to temporarily store therein data etc. pertaining to a write request from the input management unit 150. The description is mainly given of the differences from the Embodiment 1.
<Configuration>
FIG. 24 is a system configuration diagram of a processing system 1100 pertaining to Embodiment 2.

Figure 24:
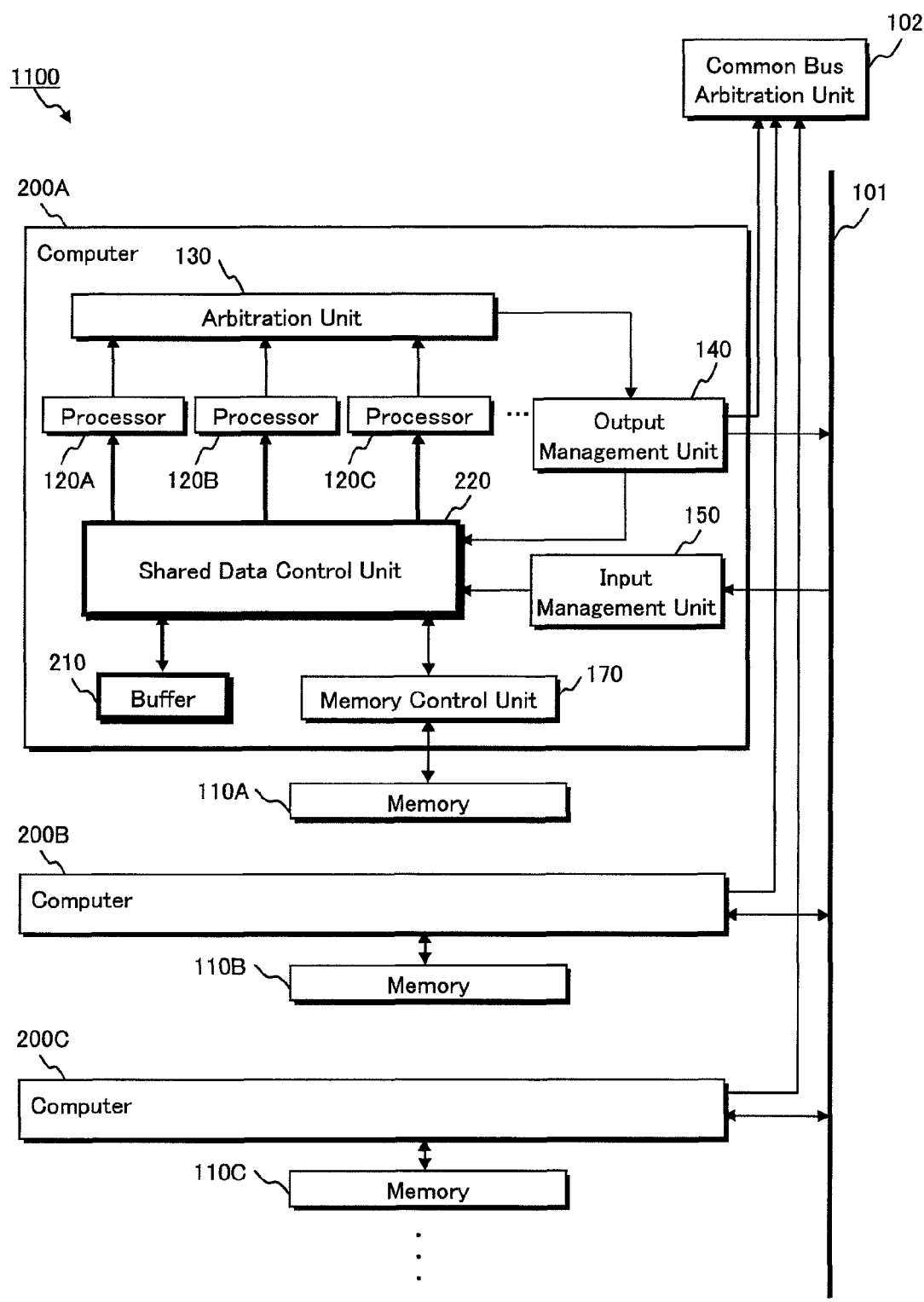
FIG. 24 is a system configuration diagram of a processing system 1100 pertaining to Embodiment 2.

As shown in FIG. 24, the processing system 1100 has computers 200A-200C instead of the computers in the processing system 1000 pertaining to Embodiment 1.

The computers 200A-200C each include a shared data control unit 220 instead of the selection unit 160 of each computer pertaining to Embodiment 1, and further include a buffer 210.

Since the computers (200A-200C) each have a similar configuration, the following describes the computer 200A taken as an example. Note that a portion shown by the heavy lines is the difference particularly from the computer 100A pertaining to Embodiment 1.

Here, the buffer 210 is a memory area for temporarily storing therein data pertaining to a write request signal received by the shared data control unit 220 via the input management unit 150. More specifically, the shared data control unit 220 stores write-target data, an address of the memory 110A that is the data write destination, and a flag showing whether the writing of the data in the memory 110A is completed, in correspondence with one another.

When the shared data control unit 220 receives the memory access request signal from the output management unit 140 or the input management unit 150, the shared data control unit 220 accesses the buffer 210 or the memory 110A via the memory control unit 170.
<Operation>
The following describes operation of the shared data control unit 220.

Figure 25:
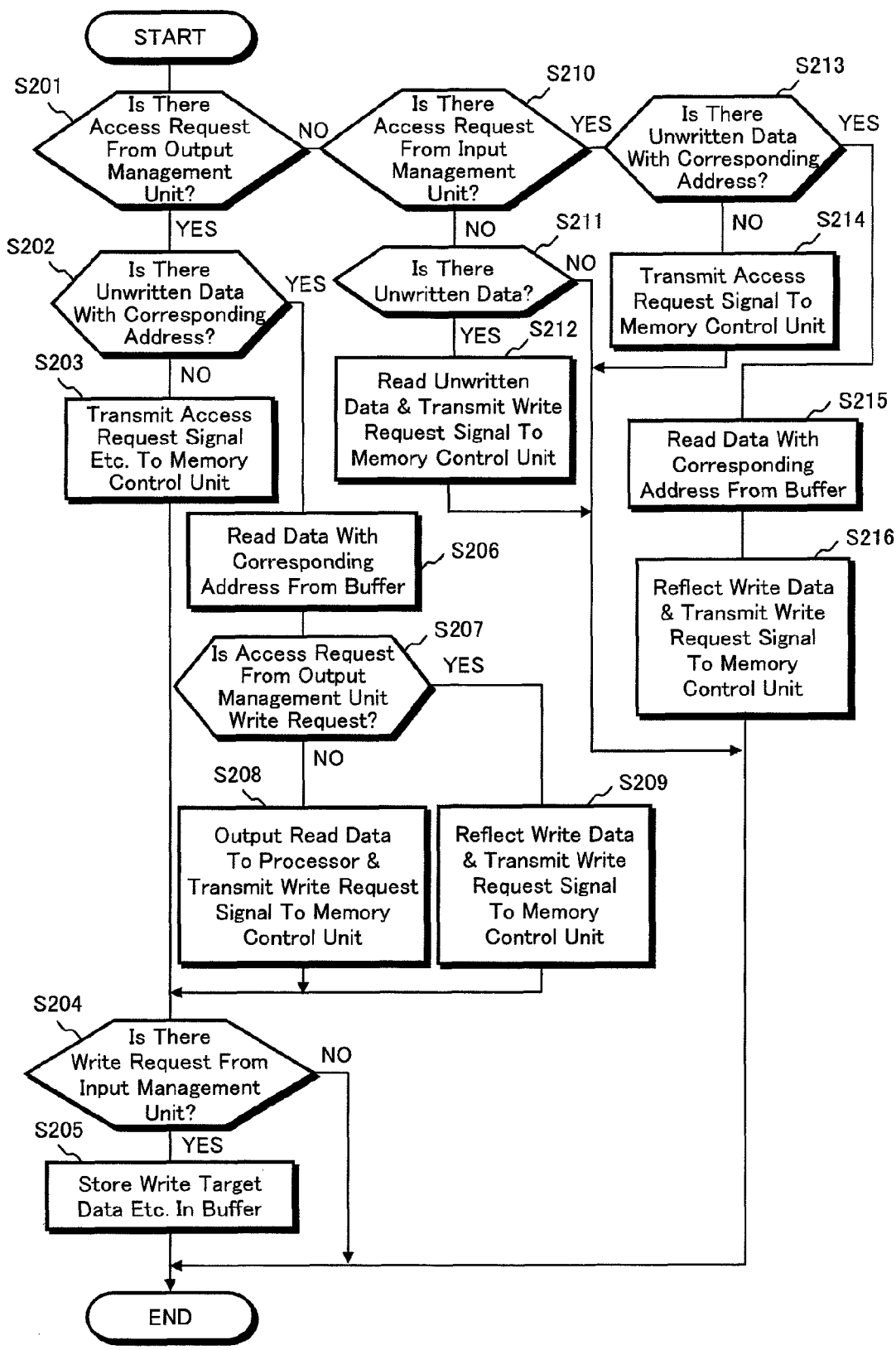
FIG. 25 is a flow chart showing access control processing by the shared data control unit 220.

FIG. 25 is a flow chart showing access control processing by the shared data control unit 220.

Note that process of the following Steps S201-S216 is repeated.

The shared data control unit 220 judges whether the memory access request signal is received from the output management unit 140 (Step S201). When the shared data control unit 220 judges that the signal is received (Step S201: YES), the shared data control unit 220 judges whether the memory access request signal matches the address in the memory 110A pertaining to the access request, and whether the data that has not been written in the memory 110A is stored in the buffer 210 (Step S202). More specifically, the judgment is affirmative only when data associated with (i) an address identical with an address in the memory 110A pertaining to the access request and (ii) a flag indicating that the data has not been written in the memory 110A, is stored in the buffer 210.

When the data whose address matches and which has not been written in the memory 110A is not stored in the buffer 210 (Step S202: NO), the shared data control unit 220 transmits the memory access request signal etc. from the output management unit 140 to the memory control unit 170 (Step S203).

Subsequently, the shared data control unit 220 judges whether the write request signal is received from the input management unit 150 (Step S204). When the shared data control unit 220 judges that the signal is not received (Step S204: NO), the shared data control unit 220 completes the access control processing. When the signal is received (Step S204: YES), the write-target data contained in the write request signal from the input management unit 150 is written, in the buffer 210, in correspondence with (a) an address in its corresponding memory 110A and the (b) flag indicating that the data has not been written (Step S205). Thus, the access control processing is completed.

On the other hand, in Step S202, when data whose address matches and which has not been written in the memory 110A is stored in the buffer 210 (Step S202: YES), the shared data control unit 220 reads the data from the buffer 210 (Step S206), and judges whether the memory access request signal from the output management unit 140 is a write request signal (Step S207).

When the memory access request signal from the output management unit 140 is a read-out request signal (Step S207: NO), the shared data control unit 220 transmits data read in Step S206 to the processor and a write request signal for writing the data in an address stored in the buffer 210 to the memory control unit 170 (Step S208).

On the other hand, when the memory access request signal from the output management unit 140 is a write request signal (Step S207: YES), the shared data control unit 220 reflects data pertaining to the write request signal in the data read in Step S206 (e.g. overwriting process), and transmits the write request signal for writing the reflected data in an address stored in the buffer 210 to the memory control unit 170 (Step S209).

In Step S208 or Step S209, when the shared data control unit 220 transmits the write request signal, the shared data control unit 220 updates, in the buffer 210, the flag stored in correspondence with the data pertaining to the write request to show that the writing is complete, and advances to the process in the above Step S204.

In Step S201, when the shared data control unit 220 does not receive the memory access request signal from the output management unit 140 (Step S201: NO), the shared data control unit 220 judges whether the memory access request signal (write request signal) is received from the input management unit 150 (Step S210). When judging that the signal is not received (Step S210: NO), the shared data control unit 220 judges whether the data which has not been written in the memory 110A is stored in the buffer 210 (Step S211). More specifically, when the data in correspondence with the flag showing that the data has not been written in the memory 110A is stored in the buffer 210, the judgment is affirmative.

When all the data in the buffer 210 has been written in the memory 110A (Step S211: NO), directly, the access control processing is completed. When not all the data in the buffer 210 has been written in the memory 110A (Step S211: YES), the shared data control unit 220 reads the data from the buffer 210, and transmits, to the memory control unit 170, the write request signal for writing the read data into the address stored in the buffer 210 (Step S212). Similarly to the process described in Step S208, the flag is updated, and the access control processing is completed.

On the other hand, in Step S210, when receiving the memory access request signal (write request signal) from the input management unit 150 (Step S210: YES), the shared data control unit 220 judges whether the data whose address matches and which has not been written in the memory 110A is stored in the buffer 210, as with in the step in Step S202 (Step S213).

When the data whose address matches and which has been completely written in the memory 110A is not stored in the buffer 210 (Step S213: NO), the shared data control unit 220 transmits the memory access request signal (write request signal) from the input management unit 150 to the memory control unit 170 (Step S214). Thus, the access control processing is completed.

In Step S213, when data whose address matches and which has not been written in the memory 110A is stored in the buffer 210 (Step S213: YES), the shared data control unit 220 reads the data from the buffer 210 (Step S215).

The shared data control unit 220 reflects data pertaining to the write request signal in the read-out data (e.g. overwriting process), and transmits the write request signal for writing the reflected data in the address stored in the buffer 210 to the memory control unit 170 (Step S216). As with Step S208 etc., the flag is updated. Thus, the access control processing is completed.

Thus, the shared data control unit 220 has the data (write-target data) shared with other computers stored in the buffer 210. The shared data control unit 220 writes the shared data stored in the buffer 210 when the memory access by the processor in the computer is not performed. Thus, the memory access request by the processor in the computer can be prevented from contending with the write request pertaining to the shared data (write-target data) made by other computers. In other words, the memory access by the processor within the computer can be performed at a high speed, without being suspended.

When data pertaining to the access request from the processor in the computer is stored in the buffer 210 as data that has not been completely written in the memory 110A, the shared data control unit 220 accesses the data in the buffer 210. Accordingly, even when the data (write-target data) shared with other computers has not been written in the memory 110A, the processor in the computer can access the newest shared data, and does not access the memory 110A. In this period, the data in the buffer 210 can be written, and the data in the buffer 210 can be reflected in the memory 110A in a relatively short period of time.

Embodiment 3

The following describes an embodiment modified as follows. Data used for the processing in each computer is divided into a piece of data used only by this processor and a piece of shared data, and the data pieces are respectively stored in two memories (inherent memory and shared memory) that are physically different from each other. The processor in each computer can perform the memory access at a higher speed, without being suspended. The description is given mainly of difference from Embodiment 1.

Figure 26:
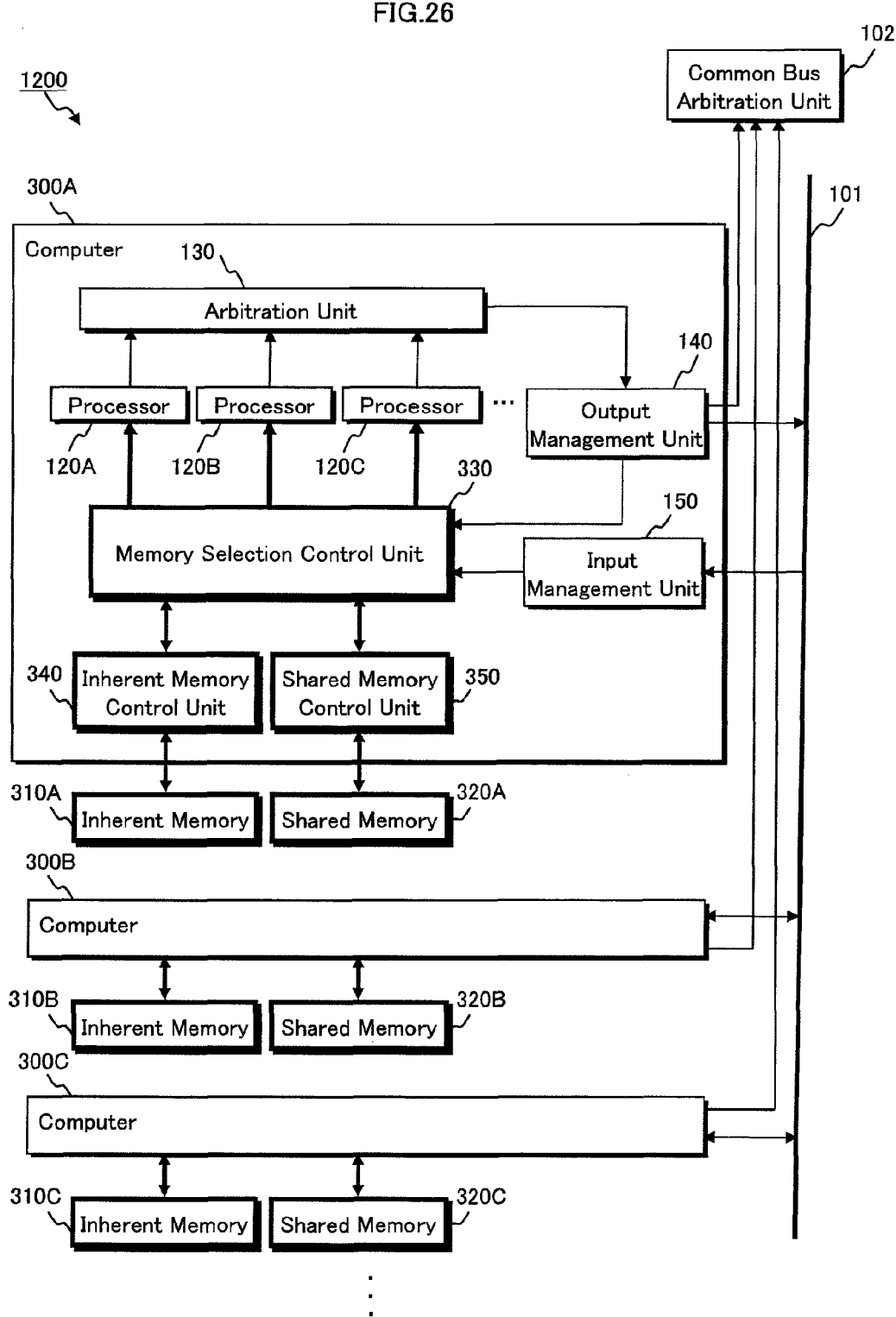
FIG. 26 is a system configuration diagram of a processing system 1200 pertaining to Embodiment 3.

FIG. 26 is a system configuration diagram of the processing system 1200 pertaining to Embodiment 3.

As shown in FIG. 26, the processing system 1200 includes computers 300A-300C instead of the computers in the processing system 1000 pertaining to Embodiment 1.

Each of the computers 300A-300C includes a memory selection control unit 330 instead of the selection unit 160 of each computer pertaining to Embodiment 1, and an inherent memory control unit 340 and a shared memory control unit 350 instead of the memory control unit 170.

Each computer is connected to the inherent memories 310A-310C and the shared memories 320A-320C instead of the memories 110A-110C.

Since each the computers (300A-300C) has the identical configuration, a description is given of the computer 300A as an example as provided below. Note that in FIG. 26, portions indicated by the heavy lines show portions particularly different from the computer 100A pertaining to Embodiment 1.

Here, the memory selection control unit 330 transmits a memory access request signal received from the output management unit 140 and a write request signal received from the input management unit 150 to the inherent memory control unit 340 or the shared memory control unit 350.

More specifically, when the memory access request signal received from the output management unit 140 is an access request signal with regard to the inherent memory 310A, this signal is transmitted to the inherent memory control unit 340. When the memory access signal is an access request signal with regard to the shared memory 320A, this signal is transmitted to the shared memory control unit 350. In addition, all write request signals received from the input management unit 150 are transmitted to the shared memory control unit 350. Particularly, when the access request signal from the output management unit 140 to the shared memory 320A and the write request signal from the input management unit 150 are received together, the write request signal from the input management unit 150 is preferentially transmitted to the shared memory control unit 350. That is to say, in this case, the processor is suspended from accessing the shared memory 320A.

Note that the memory selection control unit 330 needs to judge whether the memory access request signal received from the output management unit 140 is an access request signal with regard to the inherent memory 310A or the shared memory 320A. For this judgment, for example, the memory selection control unit 330 may (i) retain information showing correspondence between a logic address and a physical address, (ii) convert an address (logic address) contained in the memory access request signal received from the output management unit 140 to an address (physical address) in each of the memories (the inherent memory 310A and the shared memory 320A), (iii) generate a new memory access request signal designating the converted address, and (iv) transmits the signal to a corresponding memory.

The arbitration unit 130 may retain the information showing correspondence between the logic address and the physical address. When the arbitration unit 130 transmits the memory access request signal to the output management unit 140, the arbitration unit 130 may generate a new memory access request signal and transmit the signal to the output management unit 140.

Alternatively, the memory access request signal transmitted from each processor to the arbitration unit 130 may be modified to include information designating to which of the inherent memory 310A and the shared memory 320A the access request signal is related.

Based on the memory access request signal etc. received from the memory selection control unit 330, the inherent memory control unit 340 accesses the inherent memory 310A storing data unnecessary to be shared with other computers which is data used only by each processor (120A-120C) in the computer 300A. An example of such data stored in the inherent memory 310A is a program to be executed by each processor (120A-120C).

Based on the memory access request signal etc. received from the memory selection control unit 330, the shared memory control unit 350 accesses the shared memory 320A storing data shared with other computers.

Thus, since the data unnecessary to be shared with other computers is stored in the inherent memory 310A, and the shared data is stored in the shared memory 320A, the inherent memory 310A and the shared memory 320A can be accessed simultaneously. That is to say, when an access request from the processor in the computer is an access request with regard to the inherent memory 310A, this access request can be prevented from contending with the write request to write data in the shared memory 320A pertaining to the data shared with other computers (write-target data).

Embodiment 4

The following describes an embodiment combining the characteristic features of Embodiments 2 and 3. The description is given mainly of differences from Embodiment 3.

Figure 27:
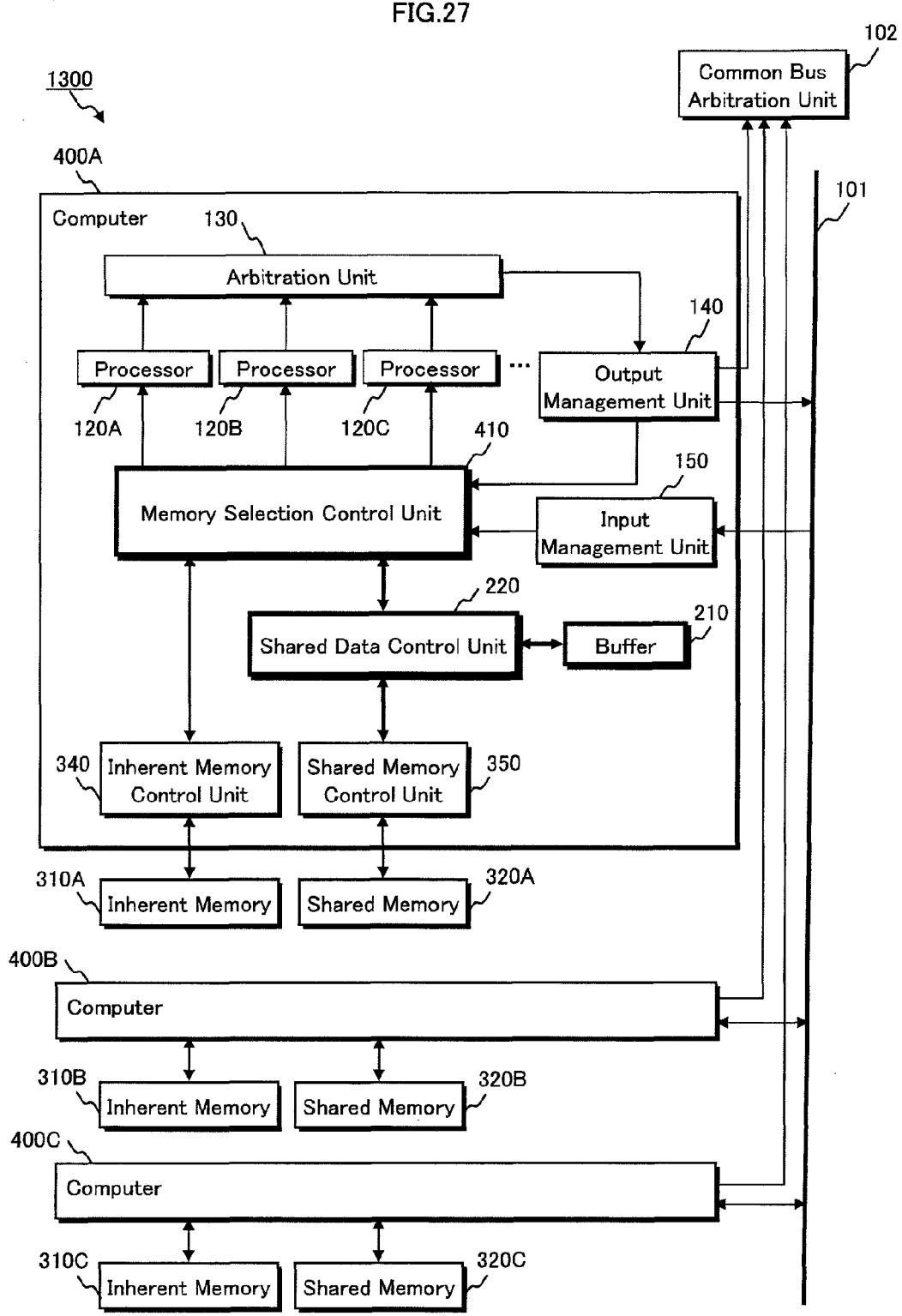
FIG. 27 is a system configuration diagram of a processing system 1300 pertaining to Embodiment 4.

FIG. 27 is a system configuration diagram of a processing system 1300 pertaining to Embodiment 4.

As shown in FIG. 27, the processing system 1300 includes computers 400A-400C instead of the computers 300A-300C pertaining to Embodiment 3.

The computers 400A-400C each include a memory selection control unit 410 instead of the memory selection control unit 330 in each computer pertaining to Embodiment 3, and the buffer 210 and the shared data control unit 220 pertaining to Embodiment 2.

Since each of the computers (400A-400C) has the identical configuration, the following description is given of the computer 400A as an example. Note that, in FIG. 27, portions indicated by the heavy lines are portions particularly different from the computer 300A pertaining to Embodiment 3.

Here, the memory selection control unit 410 is different from the memory selection control unit 330 pertaining to Embodiment 3 in that the access request signal for accessing the shared memory 320A received from the output management unit 140 and the write request signal received from the input management unit 150 are transmitted to the shared data control unit 220.

When the shared data control unit 220, via the memory selection control unit 410, receives the memory access request signal from the output management unit 140 or the input management unit 150, the shared data control unit 220 accesses the shared memory 320A or the buffer 210 via the shared memory control unit 350. More specifically, as described in Embodiment 2, the access control processing is performed, according to, the flow chart in FIG. 25.

Thus, compared with Embodiment 3, even if the access request from the processor in the computer is an access request with regard to the shared memory 320A, the access request from the processor is prevented from contending with a write request to write data in the shared memory 320A pertaining to the data (write-target data) shared with other computers. That is to say, the memory access by the processor in the computer can be performed at a high speed without being suspended.

While the processor in the computer is not accessing the shared memory 320A, the shared data control unit 220 writes the shared data stored in the buffer 210 in the shared memory 320A. That is to say, when the processor in the computer is accessing the inherent memory 310A, the shared data stored in the buffer 210 may be written in the shared memory 320A as well. Accordingly, compared with Embodiment 2, the shared data stored in the buffer 210 can be more frequently written in the shared memory 320A. Thus, the data in the buffer 210 can be reflected in the shared memory 320A at a higher speed. As a result, the buffer 210 with a smaller capacity than that of Embodiment 2 can be used.

<<Modification>>

The following describes a modification in which when the output management unit 140 in each computer receives a write request signal from a specified processor in the computer, the write-target data is outputted to the common bus 101.

Each computer (500A-500D) pertaining to Modification is obtained by slightly modifying (i) the data configuration of the output management information table 180 retained by the output management unit 140 of each computer pertaining to Embodiment 1 and (ii) the functions of the arbitration unit 130.

More specifically, the arbitration unit pertaining to Modification arbitrates the access requests from the processors with regard to the memory 110A. When the arbitration unit transmits one memory access request signal to the output management unit pertaining to Modification, the arbitration unit also transmits, to the output management unit pertaining to Modification, identification information (processor ID to be described) identifying the processor that is the transmit source of the signal.

The following describes an example in which the processing system pertaining to Modification is applied to a cooperative processing system in which the computers 500A-500D respectively perform the processes A-D as with Application Example 3. The description is given mainly of differences from Embodiment 1.

Particularly, in this example, the description is given on the following assumption. The processor 120A in each computer performs the processes A-D, and when the load of the process B by the computer 100B is increased, the processor 120B of the computer 100A shares the load the process B. Note that as with Application Example 5, when previous process results (data 0-2) are written, the computers 500B-500D pertaining to this example start the processes B-D with the use of the data.

FIG. 28A shows an exemplary content of an output management information table of each computer pertaining to Modification.

As shown in FIG. 28A, output management information of the output management information table pertaining to Modification contains a processor ID in addition to each data contained in the output management information of the output management information table 180 pertaining to Embodiment 1.

Here, the processor ID is identification information identifying a processor transmitting the write request signal with regard to corresponding shared data. Hereinafter, for example, the processors IDs of the processors 120A-120C of each computer pertaining to Modification are "0"-"2".

By setting the output management information table of each computer as shown in FIG. 28A, when the computer 500A write, in the memory 110A, data (data 0 and 1) pertaining to the write request signal from the processors (i.e. processors 120A and 120B) whose processor IDs are "0" and "1", the computer 500A outputs the data together with a corresponding master ID etc. to the common bus 101.

When the computers 500B and 500C write, in their respective memories (110B, 100C), data (data 1 and 2) pertaining to the write request signal from the processor (i.e. processor 120A) whose Processor ID is "0", the computers 500B and 500C output the data together with a corresponding master ID etc. to the common bus 101.

FIG. 28B shows an exemplary content of the input management information table 190 stored in each computer pertaining to Modification.

In this Modification, the data configuration of the input management information table 190 is identical with that of Embodiment 1. By setting the input management information table of each computer as shown in FIG. 28B, the computer 500B writes data 0 outputted from the computer 500A, the computer 500C writes data 1 outputted from the computers 500A and 500B, and the computer 500D writes data 2 outputted from the computer 500C in respective areas in the memories 110B-110D.

The following describes operation of the cooperative processing system in which the computers 500A-500D each perform the processes A-D.

FIG. 29 shows operation of each computer pertaining to Modification.

Figure 29A:
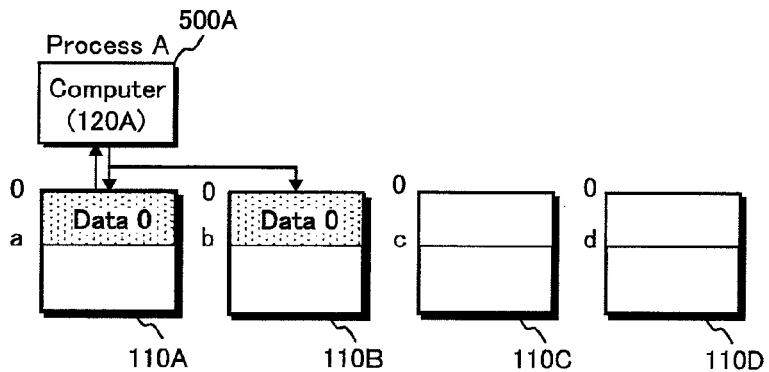
FIGS. 29A, 29B, 29C and 29D each show operation of a computer pertaining to Modification.
Figure 29B:
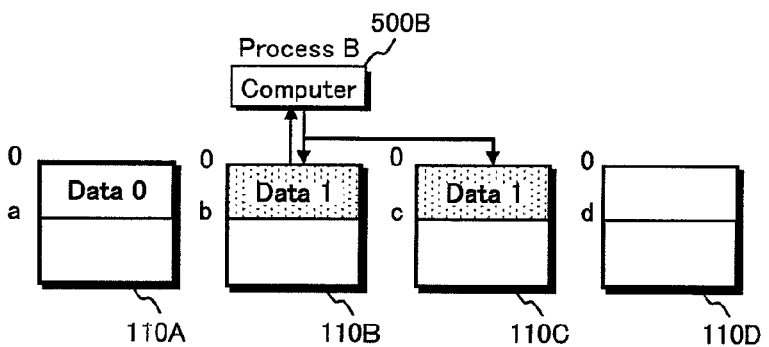
Figure 29C:
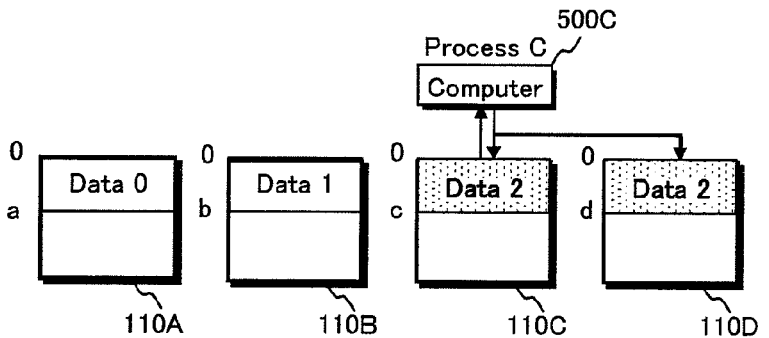

FIGS. 29A-29C each show the operation of the computer in stationary time. The detailed description thereof is omitted, since the operation is similar to the above-mentioned Application Example 3.

Figure 29D:
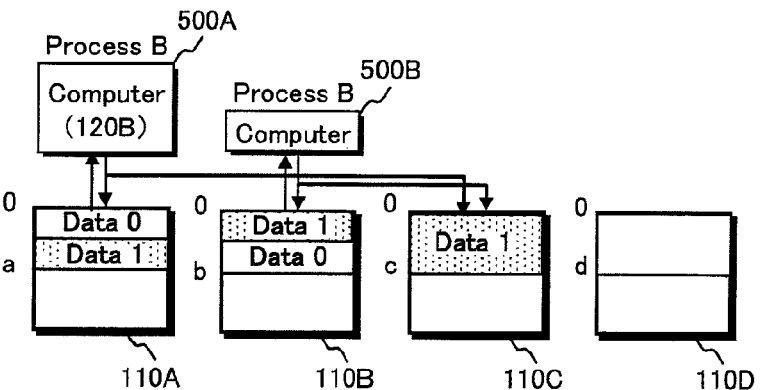
Figure 30:
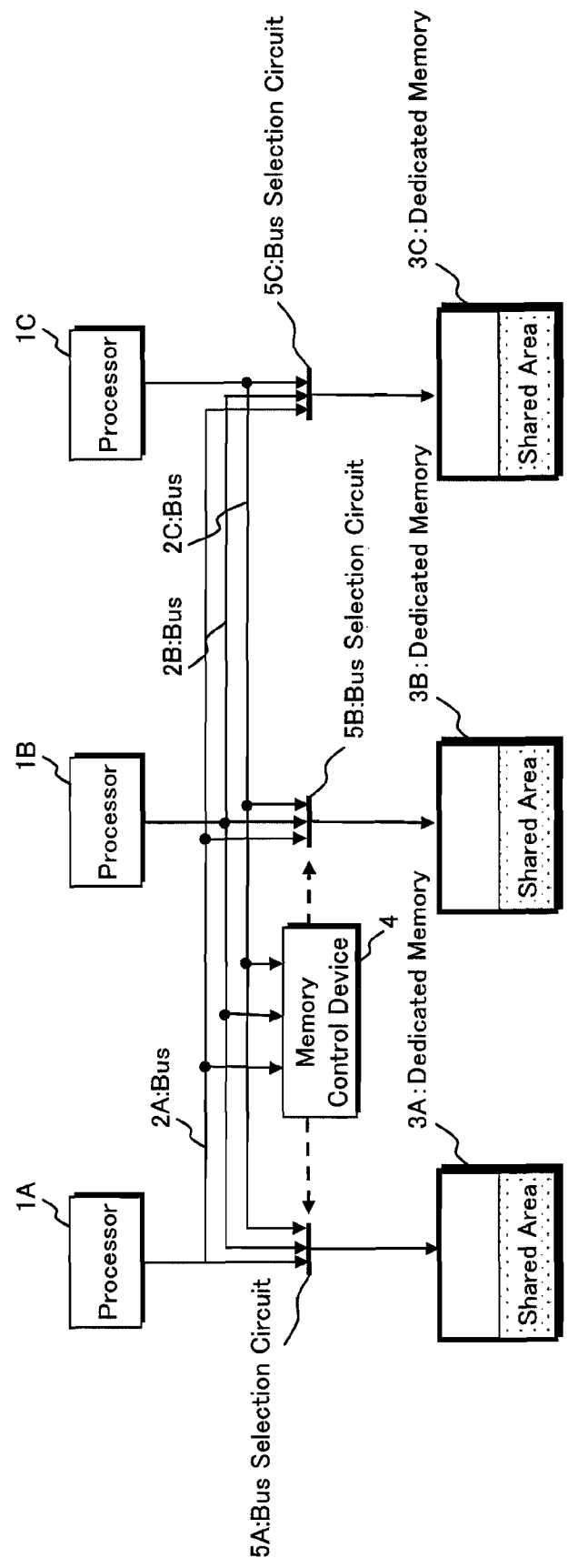
FIG. 30 shows a conventional data-sharing method used in a loosely-coupled multiprocessor system.

FIG. 29D shows a state in which the load of the process B by the computer 500B is increased so that the processor 120B of the computer 500A shares the load of the process B.

When the load of the process B is equal to or more than a predetermined amount (e.g. time from start to end of processing the process B is equal to predetermined time or longer), the computer 500B instructs the computer 500A to process a shared portion of the load of the process B. In response to this instruction, the processor 120B of the computer 500A starts to process the shared portion of the process B.

The processor 120B of the computer 500A, for example, processes the process B with the use of a last-half portion of a process result (data 0) of the process A by the processor 120A of the computer written in the memory 110A, and writes this result (last-half portion of data 1) in an area storing therein the last-half portion of the data 0 used for this process B.

In parallel with the execution of the process B by processor 120B of the computer 500A, the computer 500B, for example, processes the process B with the use of a first-half portion of data stored in the memory 110B, and writes this result (first-half portion of data 1) in an area storing therein the first-half portion of the data 0 used for this process B.

When the computers 500A and 500B each write the data 1, based on the output management information table stored in each of the computers 500A and 500B, the computers 500A and 500B outputs the data 1 to the common bus 101 (also outputs master ID etc.).

Based on the master ID etc. outputted to the common bus 101 and the input management information table 190 stored in the computer 500C, the computer 500C judges that the data 1 is to be received, writes the data in a corresponding area in the memory 110C, and starts the process C.

Thus, since the output management information table pertaining to Modification contains the processor ID, as described above, if the area in the memory 110A for the processor 120A of the computer 500A to write the data 0 and the area in the memory 110A for the processor 120B of the computer 500A to write the data 1 overlap with each other, the shared data pertaining to write request signals from different processors can be managed as separate data. That is to say, as described above, the data 0 outputted from the computer 500A to the common bus 101 can be received by the computer 500B, and the data 1 can be received by the computer 500C.

A storage area in the memory for storing separate shared data may be overlapped with each other, which saves the storage area for storing the shared data in the memory.

Note that, as described in Application Example 3, by storing data for a plurality of generations in each memory, the computers can perform their respective processes in parallel.

<Supplement>

Thus, the description is given of the processing system pertaining to the present invention, based on each embodiment and modification. However, the processing system pertaining to the present invention may be modified as follows, and is never limited to the processing system as shown in each embodiment and modification.

(1) In each embodiment and modification, the description is given as follows. The output management information and input management information includes a "valid". When the valid shows "1", the output management information and the input management information are valid. However, the valid may be omitted, and only valid output management information and input management information may be registered in the output management information table and the input management information table.

(2) In each embodiment and modification, the description is given that the output management information table and the input management information table are separately provided. However, the output management information and the input management information may be registered in one input and output management table, and the output judgment unit 143 of the output management unit and the input judgment unit 152 of the input management unit may refer to the input and output management table for the judgment. In this case, a flag is registered in the input and output management table to distinguish from the output management information to the input management information.

Furthermore, in a system for sharing data to be mutually updated by the computers, the output management information and the input management information do not need to be distinguished from each other. In accordance with the input and output management information registered in the input and output management table, data pertaining to a write request by the processor of the computer may be outputted, and data outputted from other computers may be received. Compared with a case having the output management information table and the input management information table separately, this modification is effective, for the memory capacity for storing therein the tables is reduced by half.

(3) In each embodiment and modification, the description is given as follows. One processor in the arbitrary computer in the processing system generates data to be registered in the output management information table and the input management information table of each computer and register the data in each table. However, the generation and the registration may be made when the processor in each computer executes a program stored in the memory to which the computer is connected.

The output management information and the input management information include a master ID and a data ID, and shared data is identified by a combination of the IDs. Accordingly, each computer may allocate, to the shared data to be outputted to other computers, a data ID that is different from other data IDs, and the data ID may be identical with a data ID allocated by another computer. Thus, each computer may uniquely set the output management information table.

In addition, one processor inside an arbitrary computer in the processing system may only generate data to be registered in the output management information table and the input management information table of each computer. Via a table-setting bus, the processor may transmit the generated data to each computer, and register data received by another processor in each computer in the table in the computer.

In addition, the processor in each computer may set validity or invalidity (i.e. updating valid) of the registered output management information and the input management information.

(4) In each embodiment and modification, the description is given of an example in which each of the output management information and the input management information includes the master ID and the data ID and in which shared data is identified by a combination of the master ID and the data ID. However, identification information that can identify each shared data through the entire system may be generated.

(5) In each embodiment and modification, the description is given that the output management information in the output management information table of each computer includes a master ID of the computer. However, each computer may separately store a master ID of the computer, and the master ID does not need to be included in the output management information.

(6) In each embodiment and modification, the description is given that the write destination address (offset outputted from other computers plus the start address of its corresponding input management information) falls within a range to the end address of its corresponding input management information. However, this is not compulsory. For example, the following control can be made so as not to write in an area other than the storage area storing its corresponding shared data.

(a) It is deemed that the write request signal not to access an area storing the shared data, such that the data is controlled not to be written in the memory of the computer.

(b) Data is stored in a storage area obtained by subtracting an address of an address space in a storage area from a calculated write destination address. That is to say, the obtained storage area is determined by wrapping at the end address.

(c) The access is controlled to be made to a specific inherent address.

(7) In each embodiment and modification, the description is given that the output management information and the input management information each include an end address. However, the end address does not need to be included. In such a case, for example, a storage area for each shared data needs to have the same size.

(8) In each embodiment and modification, the description is given that the start address and the end address specify a storage area of each of the output management information and the input management information. However, the present invention is not limited to this. For example, instead of the end address, an area size may be used.

(9) In each embodiment and modification, the description is given that in order to reduce the bus width of the common bus 101, the write destination address may be specified by the master ID, data ID and offset. However, the present invention is not limited to this. For example, the write destination address may be specified only by the master ID and the data ID, and all data in a corresponding area is transmitted as write-target data. In addition, the address may be specified by outputting all bits or part of bits of an address contained in the memory access request signal received from the processor via the arbitration unit.

(10) In each embodiment and modification, to simplify the description, the description is given that a transfer unit of the access request in the memory access request signal transmitted from the arbitration unit is defined as a unit executable in one cycle. However, the present invention is not limited to this. For example, an access request may be also performed with burst transfer transferring in a plurality of cycles.

In this case, during the burst transfer, if an access is made to straddle storage areas set by the output management information table, some modifications needs to be made as follows. For example, the access request is divided into a non-shared data access and a shared data access, and process is performed according to the non-shared data access and the shared data access. Alternatively, since an arbitration unit is defined as a one burst transfer in the common bus arbitration unit 102, the output management unit transmits, to the common bus arbitration unit 102, a signal notifying the completion of data transfer to the common bus 101. Since these modifications can be made with the use of existing mounting techniques, a detailed description thereof is omitted herein.

(11) In each embodiment and modification, to simplify the description, the description is given that the memory control unit 170, the inherent memory control unit 340, and the shared memory control unit 350 are simply for writing data pertaining to the write request signal in the memory. However, this write request signal may include control information for performing special processing on the write process, such as byte mask. The memory control unit 170 etc. may update data in accordance with the control information.

(12) In Embodiment 2, the description is given that data that is stored in the buffer 210 and that has not been written in the memory is written in the memory while the processor in the computer is not accessing the memory. However, for example, when some data in the buffer 210 has not been completely written in the memory, in order to cause the data to be written in the memory, the shared data control unit 220 explicitly transmits the write request signal to the arbitration unit 130 for having the data written in the memory. As a result of the arbitration by the arbitration unit 130, when this signal is selected, the data in the buffer 210 may be written in the memory.

With this configuration, since the arbitration unit 130 can guarantee that the unwritten data in the buffer 210 is written in the memory, the following process can be avoided. For example, when the buffer becomes full, data transfer in the common bus 101 is stopped, and the memory access request of the processor selected by the arbitration unit 130 is stopped by the shared data control unit 220. Thus, the system performance can be easily guaranteed.

(13) The description is given of Embodiment 2 as follows. As shown in FIG. 25, only the write request signal from the input management unit 150 is received (Step S201: NO, S210: YES). When the data that has not been completely written in the memory 110A is stored in the buffer 210, and when the data does not match the address in the memory 110A pertaining to the write request (Step S213: NO), the shared data control unit 220 transmits the write request signal from the input management unit 150 to the memory control unit 170 (Step S214).

However, a write request signal for writing, in the memory, data written earliest in the buffer 210 may be transmitted to the memory control unit 170. Data pertaining to the write request signal from the input management unit 150 may be written in the buffer 210.

The shared data received from other computers and updated earliest can be preferentially reflected in the memory, which can reduce a period between receiving the data received from other computer and reflecting the data in the memory.

(14) According to Embodiment 2, as shown in FIG. 25, when the access requests contend with one another, the data is occasionally read out from and written in the buffer 210 simultaneously. However, by configuring the buffer 210 with a dual port memory, widening a bus of the buffer 210, increasing the operating frequency of buffer 210, and the like, the transfer band frequency of the buffer 210 can be increased. Thus, performance deterioration of memory access process caused by the suspension of transfer by the buffer 210 is avoidable.

(15) The description is given of Embodiment 2 as follows. For speeding up the memory access performance, when data pertaining to the memory access request signal received by the shared data control unit 220 is stored in the buffer 210 as data unwritten in the memory, after this data is read out and transmitted to a processor, this data is written in the memory. Alternatively, after data pertaining to the write request signal is reflected in the data read out from the buffer 210, the reflected data is written in the memory.

However, to simplify the process, the process may be performed as follows.

That is to say, when data pertaining to the read-out request signal from a processor is stored in the buffer 210 as data unwritten in the memory, after writing this unwritten data in the memory, data pertaining to the read-out request signal may be read out from the memory.

In addition, when data pertaining to the write request signal from the input management unit 150 is stored in the buffer 210 as data unwritten in the memory, writing this unwritten data in the memory and writing data pertaining to the write request in the buffer 210 may be performed in parallel.

(16) The description is given that according to Embodiment 3, all data shared with other computers is stored in the shared memory 320A. However, to improve the memory access performance by the processor in the computer, out of data to be shared with other computers, data updated only by the computer may be stored in the inherent memory 310A, and data also updated by other computers may be stored in the shared memory 320A.

As a result, access to the shared memory 320A for writing the shared data received from other computers and access to the inherent memory 310A for writing the shared data updated only by the processor in the computer may be performed in parallel. Accordingly, the memory access by the processor in the computer does not need to be suspended so that deterioration of the access performance is avoidable.

(17) The description is given of Modification where the Processor ID is included in the output management information. Instead, a Task ID that is identification information of a task may be included. That is to say, not in a processor unit, but in a task unit, it may be judged whether the shared data is to be transmitted to other computers.

(18) The description is given of Modification where the output management unit does not output the Processor ID to the common bus 101. However, modification can be made that each input management information includes the Processor ID. Each computer may judge whether the data is shared with the computer according to the Processor ID.

(19) The description is given that the configuration of each computer is identical in each embodiment and modification. However, the present invention is not limited to this. For example, the number of processors in each computer may be different, or one. In the latter case, the arbitration unit is unnecessary. That is to say, a plurality of computers each having one dedicated memory provided in a processor may be arranged in parallel, as with each embodiment and modification.

In addition, some or all of the processors may be configured with a non-processor, such as DSP (Digital Signal Processor) and accelerator (wired logic).

(20) The function blocks of the computer described in each embodiment and modification are each typically realized by an LSI (Large Scale Integration) that is an integrated circuit. These functional blocks may be each separately configured on one chip, or part or all of these are integrally covered on one chip.

Each computer may be configured with an LSI integrated on one semiconductor. The present invention is applicable as data-sharing system for sharing data among a plurality of LSIs.

Here, LSI is employed. However, according to integration degree, the LCI may be referred to as an IC, a system LSI, a super LSI, or an ultra LSI.

In addition, the integrated circuit that is a modification of the present invention is not limited to an LSI. The present invention may be realized in a dedicated circuit, or a general-purpose processor. The present invention may be realized in a FPGA (Field Programmable Gate Array) programmable after manufacturing LSI, or a reconfigurable processor whose connection and setting of circuit cells inside LSI are reconfigurable.

Furthermore, if a new technique of integrated circuit that replaces LSI is created, as a semiconductor technique or another technique derived therefrom progresses, needless to say, with the use of the new techniques, the function blocks may be integrated. Application of a bio technique or the like is a potential application.

(21) In each embodiment and modification, each memory is shown being outside of the computer. However, each memory may be inside the computer. Described as above, there are various embodiments of configuration units of LSI. However, in each embodiment, the memory of each computer may be provided outside or inside the LSI. Furthermore, a combination of memories that are outside the LSI and memories that are inside is also applicable.

(22) The description is given of each embodiment and modification where the common bus arbitration unit 102 is independently provided outside each computer. However, the common bus arbitration unit 102 may be provided inside of each of all or some of the computers.

(23) In each embodiment and modification, the description is given that the output management unit and the input management unit are each a circuit. However, for example, the functions of the output management unit and the input management unit may be realized by execution of a predetermined program by one processor contained in each computer, or separate processors may realize the functions of the output management unit and the input management unit.

(24) Each processing device provided in the processing system pertaining to the present invention corresponds to the computer and the memory pertaining to each embodiment and modification.

The shared data storage unit in the processing device pertaining to the present invention corresponds to the memory or the shared memory pertaining to each embodiment and modification. The output unit, the input unit and the management information storage unit correspond to the output management unit and the input management unit. The shared data access unit corresponds to the selection unit and the memory control unit. The buffer memory corresponds to the buffer. The access control unit corresponds to the shared data control unit and the memory control unit. The inherent data storage unit corresponds to the inherent memory. The data access unit corresponds to the memory selection control unit, the inherent memory control unit and the shared memory control unit. The first memory corresponds to the inherent memory. The second memory corresponds to the shared memory. The memory access unit corresponds to the memory selection control unit, the inherent memory control unit, the shared data control unit and the shared memory control unit.

The present invention is applicable for sharing data among processors in so-called a loosely-coupled multiprocessor system.

The invention claimed is:

1. A processing device that processes data with use of one or more data blocks shared with a plurality of external processing devices via a common bus, comprising:
   a processor;
   a shared data storage unit operable to store, respectively in one or more storage areas thereof, one or more data blocks to be shared with one or more external processing devices;
   an output unit operable, when the processor makes an access request to write data in a part of one of the data blocks, to output (a) a block identifier identifying the one of the data blocks, and (b) the data pertaining to the access request, the block identifier outputted from the output unit being unrelated to a device identifier identifying one of the external processing devices as an output destination and an address identifying one of the external processing devices as an output destination;
   an input unit operable to judge, based on a block identifier outputted from the one of the external processing devices, whether to share external data outputted, the block identifier outputted from the external processing device being unrelated to a device identifier identifying the processing device as an output destination and an address identifying the processing device as an output destination from the one of the external processing devices, and when judging affirmatively, to cause the shared data storage unit to store the external data; and
   a management information storage unit operable to store therein, block identifiers of the data blocks stored in the storage areas,
   wherein when one of the block identifiers stored in the management information storage unit is identical to the block identifier outputted from the one of the external processing devices, the input unit judges affirmatively, and
   the common bus transfers data between the external processing devices based only on the block identifier stored in the management information storage unit being identical to the block identifier outputted from the external processing device, which are unrelated to a device identifier identifying a processing device as a transfer destination and unrelated to an address identifying a processing device as a transfer destination.

2. The processing device of claim 1, wherein
the management information storage unit is further operable to store therein, in one-to-one correspondence to the block identifiers, addresses of the storage areas storing the data blocks corresponding to the block identifiers,
when the processor makes the access request to write the data in one of the storage areas shown by one of the addresses, the output unit outputs the block identifier and the data pertaining to the access request, and
when one of the block identifiers stored in the management information storage unit is identical to the block identifier outputted from the one of the external processing devices and the input unit judges affirmatively, the input unit performs data storage in the shared data storage unit, causing the external data to be written in one of the storage areas shown by one of the addresses that corresponds to the identical block identifier.

3. The processing device of claim 2, wherein
the management information storage unit further stores therein, for each of data blocks to be updated by one of the external processing devices included in the data blocks stored in the shared data storage unit, an external device identifier identifying the external processing device,
when the output unit outputs the block identifier and the data pertaining to the access request, the output unit outputs a device identifier identifying the processing device, and
the input unit judges affirmatively only when the management information storage unit stores therein a device identifier and a block identifier respectively identical to the external device identifier and the block identifier outputted from the one of the external processing devices.

4. The processing device of claim 2, further comprising:
a shared data access unit operable to access the shared data storage unit, based on an access request, wherein
each time the processor makes the access request to the shared data storage unit, the output unit transmits the access request to the shared data access unit,
when the input unit judges affirmatively, the input unit transmits, to the shared data access unit, an access request to write the external data in one of the storage areas shown by one of the addresses that corresponds to the block identifier pertaining to the judgment, and
in a case of receiving the access request from the input unit and the access request from the output unit, the shared data access unit accesses the shared data storage unit, based on the access request from the input unit in preference to the access request from the output unit.

5. The processing device of claim 2, wherein
in response to execution of a predetermined program by the processor, information stored in the management information storage unit is updated.

6. The processing device of claim 1, further comprising:
a buffer memory; and
an access control unit operable to access the shared data storage unit or the buffer memory, based on an access request, wherein
each time the processor makes the access request to the shared data storage unit, the output unit transmits the access request to the access control unit,
when the input unit judges affirmatively, the input unit transmits, to the access control unit, an access request to write the external data in one of the storage areas shown by one of the addresses that corresponds to the block identifier pertaining to the judgment, and
in a case of receiving the access request from the input unit, the access control unit (i) when receiving the access request from the output unit, writes the data pertaining to the access request from the input unit in the buffer memory, based on the access request from the input unit, and (ii) when not receiving the access request from the output unit or the input unit, reflects, in the shared data storage unit, the data having written in the buffer memory.

7. The processing device of claim 6, wherein
when receiving the access request from the output unit or the input unit, the access control unit accesses, based on the access request from the output unit or the input unit, the shared data storage unit or the buffer memory, according to whether the one of the storage areas storing the data pertaining to the access request in the shared data storage unit is identical to a storage area storing, in the shared data storage unit, the data having written in the buffer memory.

8. The processing device of claim 7, wherein
after having accessed the buffer memory based on the received access request, the access control unit stores accessed data in the shared data storage unit.

9. The processing device of claim 1, further comprising:
a data storage unit that stores therein one or more data blocks unnecessary to be shared with the external processing devices; and
a data access unit operable to access the shared data storage unit or the data storage unit, based on an access request, wherein
each time the processor makes the access request, the output unit transmits the access request to the data access unit,
when the input unit judges affirmatively, the input unit transmits, to the data access unit, an access request to write the external data in one of storage areas shown by one of the addresses that corresponds to the block identifier pertaining to the judgment,
the data access unit is able to access the shared data storage unit in parallel with the data storage unit, and
in a case of receiving the access request from the input unit and the access request from the output unit, when the one of the storage areas pertaining to the access request from the output unit is a storage area in the data storage unit, the data access unit accesses the data storage unit, based on the access request from the output unit, in parallel with the shared data storage unit, based on the access request from the input unit.

10. The processing device of claim 1, wherein
the shared data storage unit includes:
a first memory storing therein one or more data blocks to be updated only by the processing device included in the data blocks shared with the one or more external processing devices; and
a second memory storing therein the one or more data blocks to be shared with the one or more external processing devices without storing the one or more data blocks to be updated only by the processing device, wherein
the processing device further includes a memory access unit operable to access the first memory or the second memory, based on an access request,
each time the processor makes the access request, the output unit transmits the access request to the memory access unit, when the input unit judges affirmatively, the input unit transmits, to the memory access unit, an access request to write the external data in one of the storage areas shown by one of the addresses that corresponds to the block identifier pertaining to the judgment, the memory access unit is able to access the first memory in parallel with the second memory, and in a case of receiving the access request from the input unit and the access request from the output unit, when the storage area pertaining to the access request from the output unit is identical to a storage area in the first memory, the memory access unit accesses the first memory, based on the access request from the output unit, in parallel with the second memory, based on the access request from the input unit.

11. The processing device of claim 10, further comprising:

a buffer memory storing therein the data outputted from the one of the external processing devices, wherein when receiving an access request to access a storage area in the second memory, the memory access unit accesses the second memory or the buffer memory, according to whether the storage area in the second memory is identical to a storage area in the second memory storing therein the data having written in the buffer memory.

12. The processing device of claim 1, wherein the device identifier directly identifies the one of the external processing devices as the output destination.

13. The processing device of claim 1, wherein the device identifier identifies a data distribution path.

14. A processing system having a plurality of processing devices being connected via a common bus for sharing data with one another via the common bus, wherein each processing device includes:

a processor;

a shared data storage unit operable to store, respectively in one or more storage areas thereof, one or more data blocks to be shared with one or more different processing devices;

an output unit operable, when the processor makes an access request to write data in a part of one of the data blocks, to output, to the common bus, (a) a block identifier identifying the one of the data blocks, and (b) the data pertaining to the access request, the block identifier outputted from the output unit being unrelated to a device identifier identifying the one of the external processing devices as an output destination and an address identifying one of the external processing devices as an output destination;

an input unit operable to judge based on a block identifier outputted from a different processing device, whether to share external data outputted, to the common bus, the block identifier outputted from the different processing device being unrelated to a device identifier identifying the processing device as an output destination and an address identifying the processing device as an output destination from the different processing device, and when judging affirmatively, to cause the shared data storage unit to store the external data; and a management information storage unit operable to store therein, block identifiers of the data blocks stored in the storage areas, wherein when one of the block identifiers stored in the management information storage unit is identical to the block identifier outputted from the one of the external processing devices, the input unit judges affirmatively, and the common bus transfers data between processing devices based only on the block identifier stored in the management information storage unit being identical to the block identifier outputted from the external processing device, which are unrelated to a device identifier identifying a processing device as a transfer destination and an address identifying a processing device as a transfer destination.

15. The processing system of claim 14, wherein each processing device further includes:

a management information storage unit operable to store therein, in one-to-one correspondence, block identifiers of the data blocks stored in the storage areas and addresses of the storage areas, wherein when the processor makes the access request to write the data in one of the storage areas shown by one of the addresses, the output unit outputs, to the common bus, the block identifier, the data pertaining to the access request, and a device identification corresponding to the block identifier, when one of the block identifiers stored in the management information storage unit is identical to the block identifier outputted from the different processing device, the input unit judges affirmatively and causes the external data to be written in one of the storage areas shown by one of the addresses that corresponds to the identical block identifier, and a processor of one of the processing devices (i) generates information to be written in the management information storage unit by executing a predetermined program and (ii) causes the information to be written in each processing device.

16. A data sharing processing method used by a processing device that processes data with use of one or more data blocks shared with a plurality of external processing devices via a common bus, wherein the processing device includes:

a processor; and a shared data storage unit operable to store, respectively in one or more storage areas thereof, one or more data blocks to be shared with one or more external processing devices, the data sharing processing method includes steps of:

outputting, when the processor makes an access request to write data in a part of one of the data blocks, (a) a block identifier identifying the one of the data blocks, and (b) the data pertaining to the access request, the block identifier outputted based on the access request being unrelated to a device identifier identifying one of the external processing devices as an output destination and an address identifying one of the external processing devices as an output destination;

judging, based on a block identifier outputted from one of the external processing devices, whether to share external data outputted, the block identifier outputted from the external processing device being unrelated to a device identifier identifying the processing device as an output destination and an address identifying the processing device as an output destination from the one of the external processing devices, when judging affirmatively, causing the shared data storage unit to store the external data; and storing block identifiers of the data blocks stored in the storage areas, wherein when one of the block identifiers stored is identical to the block identifier outputted from the one of the external processing devices, the judging is affirmative, and the common bus transfers data between the external processing devices based only on the block identifier stored being identical to the block identifier outputted from the external processing device, which are unrelated to a device identifier identifying a processing device as a transfer destination and an address identifying a processing device as a transfer destination.

17. An integrated circuit that processes data with use of one or more data blocks shared with a plurality of external processing devices via a common bus, comprising:

a processor;

a shared data storage unit operable to store, respectively in one or more storage areas thereof, one or more data blocks to be shared with one or more external processing devices;

an output unit operable, when the processor makes an access request to write data in a part of one of the data blocks, to output (a) a block identifier identifying the one of the data blocks, and (b) the data pertaining to the access request, the block identifier outputted by the output unit being unrelated to a device identifier identifying one of the external processing devices as an output destination and an address identifying one of the external processing devices as an output destination;

an input unit operable to judge, based on a block identifier outputted from the one of the external processing devices, whether to share external data outputted, the block identifier outputted from the external processing device being unrelated to a device identifier identifying the processing device as an output destination and an address identifying the processing device as an output destination from the one of the external processing devices, and when judging affirmatively, to cause the shared data storage unit to store the external data; and a management information storage unit operable to store therein, block identifiers of the data blocks stored in the storage areas, wherein when one of the block identifiers stored in the management information storage unit is identical to the block identifier outputted from the one of the external processing devices, the input unit judges affirmatively, and the common bus transfers data between the external processing devices based only on the block identifier stored in the management information storage unit being identical to the block identifier outputted from the external processing device, which are unrelated to a device identifier identifying a processing device as a transfer destination and an address identifying a processing device as a transfer destination.

* * * * *